(12) United States Patent
Park et al.

(10) Patent No.: US 12,265,508 B2
(45) Date of Patent: Apr. 1, 2025

(54) GENERATING AND PROVIDING GRAPHICAL USER INTERFACES FOR PRESENTING AND NAVIGATING DIGITAL CONTENT IN A NONHIERARCHICAL VISUAL STRUCTURE

(71) Applicant: Dropbox, Inc., San Francisco, CA (US)

(72) Inventors: LeeJun Park, San Jose, CA (US); Ajit Venkatachalam, Seattle, WA (US); Ge Zhang, Seattle, WA (US); Bhargavi Minderler, Los Angeles, CA (US); Paul Kim, Austin, TX (US)

(73) Assignee: Dropbox, Inc., San Francisco, CA (US)

( * ) Notice: Subject to any disclaimer, the term of this patent is extended or adjusted under 35 U.S.C. 154(b) by 44 days.

(21) Appl. No.: 18/065,264

(22) Filed: Dec. 13, 2022

(65) Prior Publication Data
US 2024/0193132 A1   Jun. 13, 2024

(51) Int. Cl.
*G06F 16/185*   (2019.01)
*G06F 3/0482*   (2013.01)
*G06F 3/0486*   (2013.01)
*G06F 16/16*   (2019.01)

(52) U.S. Cl.
CPC .......... *G06F 16/185* (2019.01); *G06F 3/0482* (2013.01); *G06F 3/0486* (2013.01); *G06F 16/168* (2019.01)

(58) Field of Classification Search
None
See application file for complete search history.

(56) References Cited

U.S. PATENT DOCUMENTS

| 8,515,959 | B2 | 8/2013 | Cofino et al. |
| 9,361,313 | B2 | 6/2016 | Kaasten et al. |
| 9,805,042 | B1 * | 10/2017 | Meyer ..................... G06F 16/16 |

(Continued)

FOREIGN PATENT DOCUMENTS

WO   WO-2012097306 A1 *  7/2012  ............. G06F 16/14

OTHER PUBLICATIONS

Apple Support, "Use Desktop Stacks on MAC," macOS User Guide, 2022, 2 pages, Retrieved from Internet: https://support.apple.com/guide/mac-help/organize-your-desktop-with-stacks-mh35846/mac.

(Continued)

*Primary Examiner* — Augustine K. Obisesan
(74) *Attorney, Agent, or Firm* — Keller Preece PLLC

(57) ABSTRACT

The present disclosure is directed toward systems, methods, and non-transitory computer-readable media for determining for a folder a file organization score and providing a free flow element based on the file organization score selectable to transition from providing a folder view to providing a free flow view. In some embodiments, the disclosed systems determine the file organization score indicating file organizational patterns associated with content items within the folder. Furthermore, based on receiving an indication of a selection of the free flow element, the disclosed systems transition from providing the folder view of the folder to providing the free flow view depicting graphical representations of the content items. Moreover, the graphical representations of the content items are arranged according to one or more content features associated with the content items.

20 Claims, 22 Drawing Sheets

(56) References Cited

U.S. PATENT DOCUMENTS

| | | | |
|---|---|---|---|
| 2005/0283742 A1* | 12/2005 | Gusmorino | G06F 3/04817 |
| | | | 715/838 |
| 2006/0161868 A1* | 7/2006 | Van Dok | G06F 3/0481 |
| | | | 715/835 |
| 2008/0307303 A1* | 12/2008 | Louch | G06F 3/0481 |
| | | | 715/782 |
| 2009/0106674 A1* | 4/2009 | Bray | G06F 16/156 |
| | | | 715/762 |
| 2009/0259606 A1 | 10/2009 | Seah | |
| 2015/0350220 A1* | 12/2015 | Espinosa | H04L 67/1076 |
| | | | 726/28 |
| 2018/0011868 A1* | 1/2018 | Allen | G06F 40/295 |
| 2019/0303194 A1* | 10/2019 | Namihira | G06F 9/48 |
| 2022/0351139 A1* | 11/2022 | Mowatt | G06F 21/6245 |
| 2023/0177004 A1* | 6/2023 | Kong | G06F 16/18 |
| | | | 707/822 |

OTHER PUBLICATIONS

Kohonen T., et al., "Self Organization of a Massive Document Collection," IEEE Transactions on Neural Networks, vol. 11, No. 3, May 2000, pp. 574-585.

* cited by examiner

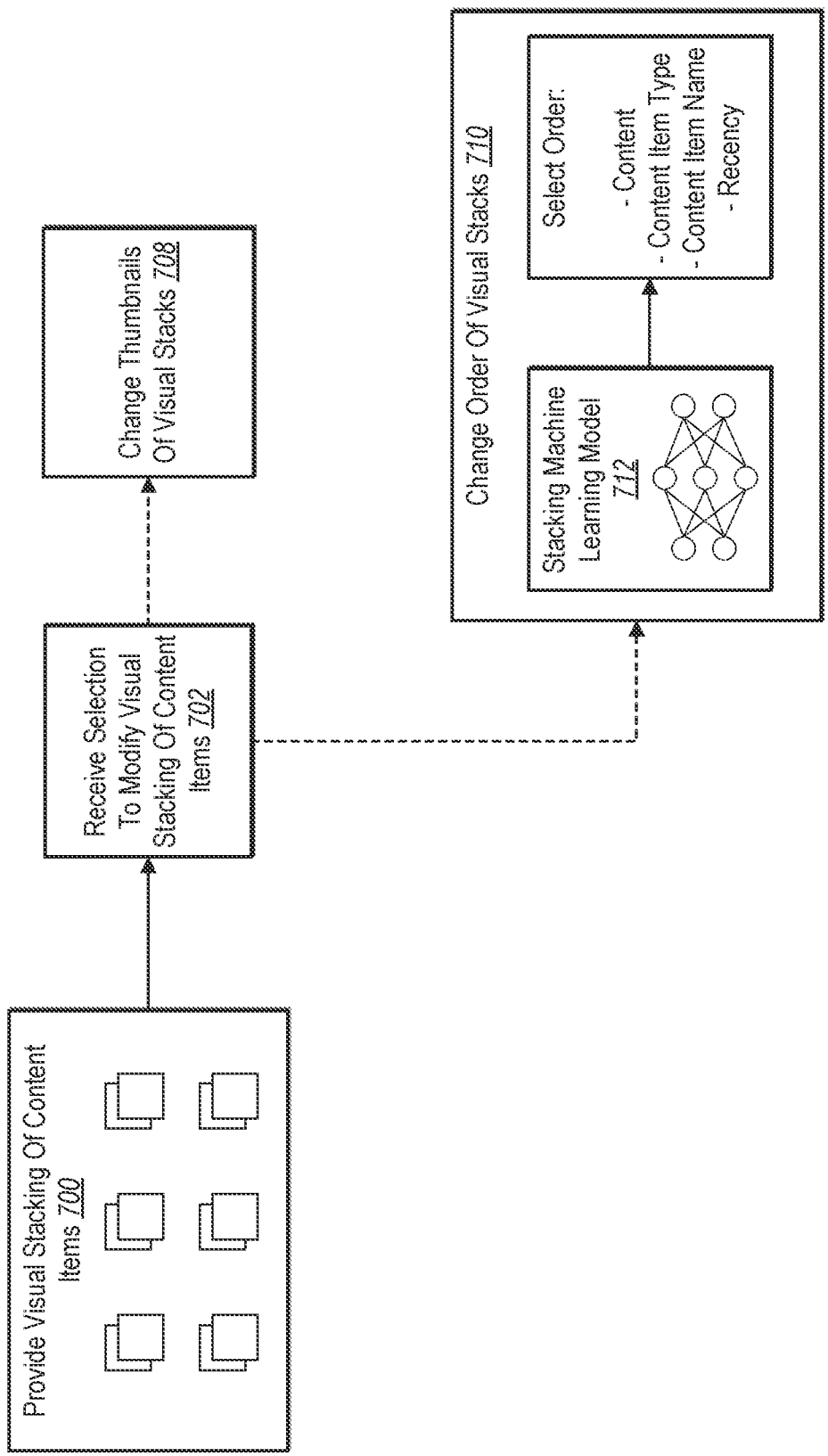

GENERATING AND PROVIDING GRAPHICAL USER INTERFACES FOR PRESENTING AND NAVIGATING DIGITAL CONTENT IN A NONHIERARCHICAL VISUAL STRUCTURE

BACKGROUND

Advancements in computing devices and networking technology have given rise to a variety of innovations in cloud-based digital content storage and organization. For example, online digital content systems can provide access to digital content items across devices all over the world. Existing systems typically assign files to different folder locations and provide user interfaces that present files within the assigned folders. Indeed, existing online digital content systems often provide a display of folder hierarchy structure to allow users to view and navigate content items within the digital content system. Despite these advances, however, existing digital content systems continue to suffer from a number of disadvantages, particularly in terms of efficiency and flexibility.

As just suggested, some existing digital content systems are inefficient. In particular, many existing systems have a high barrier for creating an initial folder organizational structure. For example, to organize content items, existing systems generally require creating a plurality of folders, assigning naming conventions to folders, creating subfolders, and moving/transferring content items to a folder and subfolder in a logical manner. Further, users of existing systems typically need to constantly reiterate their folder organizational structure based on the existence of new files and a desire for additional subfolder organization. Accordingly, existing systems are inefficient and require communication bandwidth and computational resources (e.g., computer processing and memory) to implement a logical folder organizational structure.

Furthermore, in addition to inefficiencies associated with creating an initial folder organizational structure, existing systems suffer from excessive navigating due to inefficient graphical user interfaces. For example, in existing systems, navigating multiple screens is required to reach a file within a folder or within a subfolder. In particular, to locate a file, existing systems generally require multiple selections and navigations through a hierarchy of folders. Often this also includes switching between different levels of the folder hierarchy to double-check whether a file was missed. Further, in saving new files or moving files between folders, existing systems typically require repetitively navigating through the levels of a folder hierarchy. Accordingly, the graphical user interface navigation in existing systems often requires multiple steps (e.g., 3 or more) to simply access a file, to save a new file, or to move a file within typical folder hierarchy.

Due at least in part to their inefficiencies, many existing digital content systems are inflexible. To elaborate, existing systems utilize traditional folder hierarchies as a means to organize content items within a digital content system. For instance, traditional folder hierarchies are generally the only mode available for organizing content items. The folder hierarchy paradigm remains the dominant convention within existing digital content systems. As such, existing systems suffer from inflexibilities in providing various modes of file organization.

Thus, there are several disadvantages with regard to existing digital content systems.

SUMMARY

This disclosure describes one or more embodiments of systems, methods, and non-transitory computer-readable storage media that provide benefits and/or solve one or more of the foregoing and other problems in the art. For instance, the disclosed systems provide a new method for determining a folder organization score indicating file organizational patterns and based on the score and various selections, transitioning from providing a folder view of the folder to providing a free flow view. In some embodiments, the disclosed systems based on the file organization score provides for display within a user interface a free flow element selectable to transition the folder view. In addition, based on receiving a selection of the free flow element, the disclosed systems can provide the free flow view depicting graphical representations of content items and arranged according to various content features.

Additional features of the disclosed systems are described below.

BRIEF DESCRIPTION OF THE DRAWINGS

This disclosure will describe one or more example implementations of the systems and methods with additional specificity and detail by referencing the accompanying figures. The following paragraphs briefly describe those figures, in which:

FIGS. 7A-7B illustrates an example graphical user interface of receiving a selection to modify visual stacking of content items in accordance with one or more embodiments;

DETAILED DESCRIPTION

Figure 1:
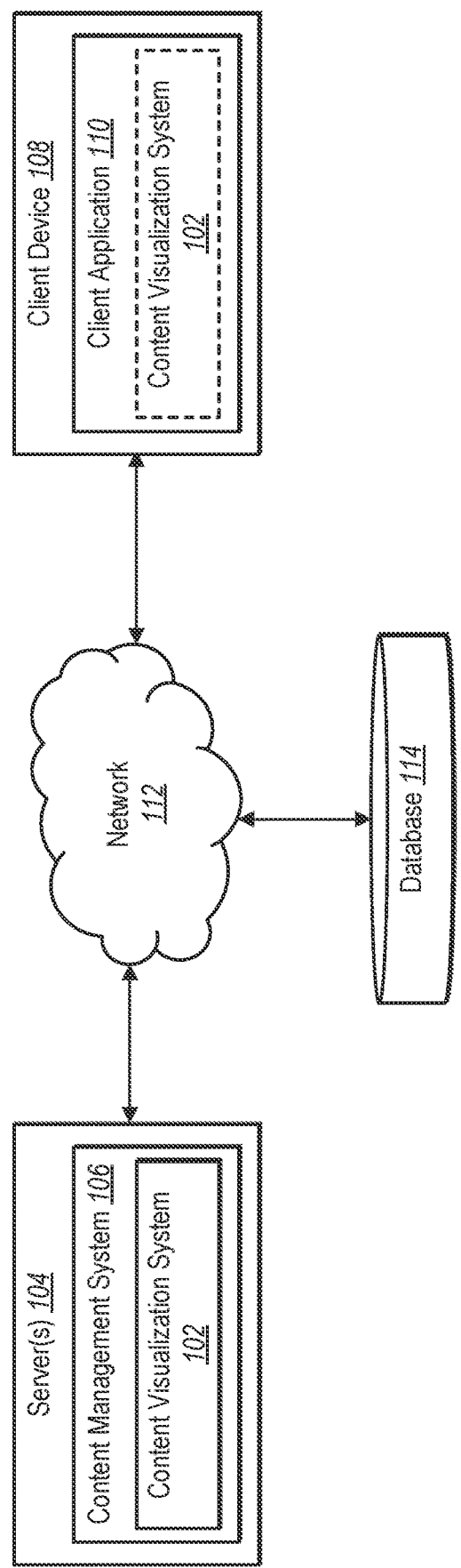
FIG. 1 illustrates a schematic diagram of an example environment of a content visualization system in accordance with one or more embodiments.

This disclosure describes one or more embodiments of a content visualization system that provides a nonhierarchical visual structure (i.e., a free flow view) for depicting graphical representations of content items (e.g., digital files). For instance, the content visualization system can determine or otherwise detect when a folder hierarchy may be contributing to disorganization of content items associated with a user account or a portion of a user's account (e.g., a folder). Based upon this determination, the content visualization system can provide the free flow view by removing the folder hierarchy to present content items in a graphical user interface within which content items are easily identified and easily accessed without a user having to navigate through the folder hierarchy. In addition, the content visualization system can further generate a free flow view that organizes content items into visual stacks based on content features (e.g., type of file, contents of file, etc.). Accordingly, the content visualization system can transition from a cluttered folder hierarchy view to a free flow view to reduce content access friction and content navigation friction (e.g., by reducing the number of navigation steps) that results in a significantly more efficient system. Indeed, the content visualization system allows even the most disorganized users to access and navigate content items effectively and flexibly within the free flow view.

As mentioned above, the content visualization system can determine or predict when a folder hierarchy is less than ideal for a particular user or for a particular portion of a user account. For example, the content visualization system can determine a file organization score for one or more folders of a user account of a content management system. Based on the file organization score, the content visualization system can provide within a user interface a selectable free flow option. For example, the content visualization system can present the free flow element based on a file organization score that indicates organization that deviates from traditional organizational patterns (e.g., deviates from folder hierarchies). For example, the file organization score can indicate when a user is simply saving content items in a folder without creating a traditional organization of the content items using folders. Thus, when the content visualization system determines such a situation exists, the content visualization system can provide the free flow option to allow a user to switch from the folder view to the free flow view.

In one or more embodiments, based on the content visualization system receiving an indication of a user selection of the free flow element, the content visualization system transitions to the free flow view that depicts graphical representations of content items arranged according to one or more content features associated with the content items (e.g., content within content items, file type, file name, date created/modified, etc.). For example, the content visualization system can provide a visual stacking of content items based on content features that provides an efficient mode of organizing, viewing, and navigating content items without using folder hierarchies. In some embodiments, the content visualization system can determine to organize content items within a plurality of visual stacks based on utilizing a machine learning model. For example, the machine learning model can assign content items with the same or similar content features to a content item grouping, and the content visualization system can provide a display of content item groupings as a plurality of visual stacks, as will be discussed in additional detail below.

In addition to providing a plurality of visual stacks within which content items are organized, the content visualization system provides unique navigation features that allow a user to quickly and easily navigate and access content items within the visual stacks. For instance, the content visualization system can receive an indication of a user selection of a first visual stack from a plurality of visual stacks. Based on receiving the indication of the user selection, the content visualization system expands the first visual stack to provide a display of individual content items within the first visual stack. Moreover, in some embodiments, while providing a display of the individual content items from the first visual stack, the content visualization system continues to provide a display of the other visual stacks from the plurality of visual stacks. Accordingly, the content visualization system allows a user to navigate through individual content items without drilling down into a folder hierarchy that inherently causes content items to be removed from an interface.

As just mentioned, the content visualization system provides a free flow view that allows a user to navigate through multiple visual stacks of content items while persisting the display of the visual stacks. Since the free flow view persists the display of the visual stacks, the content visualization system can detect a drag-and-drop gesture of a content item from a first visual stack to a second visual stack, which reassigns the content item from the first visual stack to the second visual stack. Accordingly, the free flow view that the content visualization system provides allows a user to quickly and efficiently update an organization of content items within the visual stacks, which requires fewer steps compared to moving a file through a series of hierarchical folders.

Furthermore, in some embodiments, the content visualization system receives uploads of content items via the free form view. For example, the content visualization system can provide an upload area into which a user can drag content items to upload, and the content visualization system receives an upload of new content items based on a user dragging them in to the upload area. In response to receiving the uploaded new content items, the visualization system can analyze the new content items based on content features of the new content items, and based on the analysis, the content visualization system can assign the new content items into one or more of the plurality of visual stacks. In one or more example embodiments, the visualization system further generates a visual notification corresponding to the uploaded new content item that shows to which of the plurality of visual stacks the uploaded new content item was assigned.

As suggested above, the content visualization system can provide several improvements or advantages over existing digital content systems. For example, some embodiments of the content visualization system can improve efficiency over prior systems. As opposed to existing systems that rigidly adhere to file organization conventions such as creating a plurality of folders, naming conventions, subfolders, and moving/transferring content items to folders and subfolders, the content visualization system can provide for display a free flow element (based on a file organization score) selectable to transition a folder view with a first organizational format into a free flow view comprising a second organizational format. The second organizational format can show the content items within various visual stacks and can expand each of the visual stacks without navigating to a different view. As a result, the content visualization system can provide a more efficient display and organizational structure by providing the free flow view which obviates the number of user interactions needed to create folders, name folders, and locate the specific folder/subfolder combination for saving a content item. Furthermore, the content visualization system also reduces the communication bandwidth and computational resources required to move/transfer content items to different folder locations. Indeed, the content visualization system can alleviate the burden placed on client devices and content management system servers by automating the organizational structures in the free flow view.

As another example, the content visualization system also improves efficiency by reducing the number of selections and maneuvers to correctly locate content items. For example, by transitioning from providing the folder view to providing the free flow view depicting graphical representations of the content items arranged according to content features (e.g., within visual stacks), the content visualization system reduces the number of clicks needed to find a content item. Specifically, the content visualization system does so by providing for a client device the option to select a correct category of visual stacks to expand and show all the content items within the selected visual stack without navigating to another screen. Accordingly, the content visualization system minimizes the number of navigation steps between various graphical user interfaces and keeps all the content items within a single interface (e.g., on a single screen).

In addition to improving upon efficiency, the content visualization system also improves upon flexibility over existing content item systems. For example, the content visualization system provides for an alternative paradigm to the traditional folder structure hierarchy. In particular, the content visualization system provides the free flow view and further allows for visual stacks of the content items rather than merely organizing content items within a rigid folder structure hierarchy. The free flow view provides for a different visualization of file organization and obviates the need for the user to create a plurality of folders and subfolders. Furthermore, the content visualization system provides for additional organizational tools such as drag-and-drop of content items between visual stacks, changing the representative thumbnail, and combining/splitting visual stacks. All of these features further improve upon flexibility as compared to prior systems.

As illustrated by the foregoing discussion, the present disclosure utilizes a variety of terms to describe features and benefits of the content visualization system. Additional detail is hereafter provided regarding the meaning of these terms as used in this disclosure. As mentioned above, the content visualization system can utilize folders. As used herein, the term "folder" refers to a storage location for content items or other folders, e.g., subfolders. In particular, the term folder includes a pointer to content item locations (e.g., server location) or subfolder locations within a content management system.

Relatedly, as used herein, the term "content item" (or simply "content item") refers to a digital object or a digital file that includes information interpretable by a computing device (e.g., a client device) to present information to a user. A content item can include a file such as a digital text file, a digital image file, a digital audio file, a webpage, a website, a digital video file, a web file, a link, a digital document file, or some other type of file or digital object. A content item can have a particular file type or file format, which may differ for different types of digital content items (e.g., digital documents. digital images, digital videos, or digital audio files). In some cases, a content item can refer to a remotely stored (e.g., cloud-based) item or a link (e.g., a link to a cloud-based item or a web-based content item) and/or a content clip that indicates (or links) a discrete selection or segmented sub-portion of content from a webpage or some other content item or source. A content item can be editable or otherwise modifiable and can also be sharable from one user account (or client device) to another. In some cases, a content item is modifiable by multiple user accounts (or client devices) simultaneously and/or at different times.

Relatedly, the content visualization system can display the content items within a folder view. As used herein, the term "folder view" refers to a visualization via a graphical user interface of content items within a file organizational hierarchy. In particular, the folder view includes visually displaying created folders and subfolders potentially with one or more content items. For instance, selecting a folder in the folder view can cause the graphical user interface to navigate to another display and show one or more content items within the folder or one or more subfolders within the folder.

As just mentioned, the content visualization system can utilize the folder view to visually display the content items within the file organizational hierarchy. As used herein, the term "file storage hierarchical structure" refers to a mode of storage and organization in the back-end of the content visualization system (e.g., server-side). For example, the file storage hierarchical structure includes URL paths that act as pointers for the storage and location of content items within the content management system. In particular, the content visualization system can utilize data tables to store URL paths of content items for corresponding folders and subfolders. Accordingly, the file storage hierarchical structure includes a back-end data structure that defines storage locations of content items while allowing the content visualization system to provide a front-facing visualization of the content items that references the back-end data structure (i.e., the folder view) or that does not reference the back-end data structure (i.e., the free flow view).

As mentioned above, the content visualization system can determine a file organization score. As used herein, the term "file organization score" refers to a score reflecting patterns of file organization. For example, file organization score includes a score (e.g., a number) that represents the orderliness of a folder. In particular, the file organization score includes a calculation of different content features such as the number of content items within a folder, the type of content items within the folder, the presence of subfolders, the relatedness of digital content within the content items, user account behavior, and the movement of content items between different folders or subfolders. Furthermore, the file organization score reflects an aggregation of one or more of the described features.

As also mentioned above, based on the file organization score, the content visualization system can provide a free flow element for display within a user interface. As used herein, the term "free flow element" refers to a selectable element within the graphical user interface. For example, the free flow element includes a selectable element that causes the content visualization system to switch from a folder view to a free flow view.

As used herein, the term "free flow view" refers to a visualization via a graphical user interface of content items within a nonhierarchical visual organization. For example, the free flow view includes displaying content items in visualizations that do not include folders and subfolders. As will be described in greater detail below, examples of the free flow view provide a flexible alternative mode of visualizing content items within a user account of a content management system.

When in the free flow view, the content visualization system can organize content items based on content features. As used herein, the term "content features" includes properties or attributes corresponding to a content item. For example, content features can include inherent properties of content items and/or user account behaviors applied to content items. For instance, content features can include a number of content items in a folder, a number of subfolders, movement or editing of content items, timestamps of actions performed with respect to a content item (e.g., creation, modification, etc.), content item names, content item types, or digital content within content items. In at least some examples, the content visualization system can determine content features by identifying metadata properties associated with the content items, while other examples the content visualization system can analyze the digital content of the content item itself.

As mentioned above, the content visualization system can provide content items for display in one or more visual stacks. As used herein, the term "visual stack" refers to a graphical representation of a grouping of content items displayed within a graphical user interface. For example, a visual stack can visually display one or more content items in what appears as a visual pile of content items based on one or more content features. For instance, visual stacks can display a representative thumbnail to manifest a general category of the visual stack, as well as a number of content items underneath the representative thumbnail.

As further mentioned, the content visualization system can detect drag-and-drop gestures. As used herein, the term "drag-and-drop gesture" refers to an action performed by a computing device. For example, the drag-and-drop gesture includes a selection and movement of a content item. In particular, the drag-and-drop gesture includes selecting and holding a content item, dragging it to a new location, and then releasing the gesture to drop the content item in the new location.

As mentioned above, in some embodiments, the content visualization system can determine a file organization score using one or more machine learning models. As used herein, the term "machine learning model" refers to a computer algorithm or a collection of computer algorithms that are tuned for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks. As described in further detail below, the content visualization system utilizes a "free flow machine learning model" that can include, for example, one or more neural networks, to select or predict the orderliness (or rather the clutter) of content items within a folder. In addition, the content visualization system utilizes a machine learning model, such as a neural network, to generate or predict the likelihood that a user account may find the free flow view useful. In some cases, the content visualization system utilizes a machine learning model to assign content items to visual stacks and/or to determine the order of content items within a visual stack. Further, the content visualization system can utilize a machine learning model to identify a representative thumbnail of a visual stack.

Relatedly, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., generated recommendation scores) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, or a generative adversarial neural network. Upon training as described below, such a neural network may become a content attribute neural network or a dynamic facet neural network.

Additional detail regarding the content visualization system will now be provided with reference to the figures. For example, FIG. 1 illustrates a schematic diagram of an example system environment for implementing a content visualization system 102 in accordance with one or more implementations. An overview of the content visualization system 102 is described in relation to FIG. 1. Thereafter, a more detailed description of the components and processes of the content visualization system 102 is provided in relation to the subsequent figures.

As shown, the environment includes server(s) 104, a client device 108, a database 114, and a network 112. Each of the components of the environment can communicate via the network 112, and the network 112 may be any suitable network over which computing devices can communicate. Example networks are discussed in more detail below in relation to FIGS. 10-11.

As mentioned above, the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 10-11. The client device 108 can communicate with the server(s) 104 and/or the database 114 via the network 112. For example, the client device 108 can receive user input from a user interacting with the client device 108 (e.g., via the client application 110) to, for instance, access, generate, modify, or share a content item, to collaborate with a co-user of a different client device, or to select a user interface element to accept a suggested content collection. In addition, the content visualization system 102 on the server(s) 104 can receive information relating to various interactions with content items and/or user interface elements based on the input received by the client device 108 (e.g., file organization score, content features, file organizational patterns, selection of the free flow element, or selection of a visual stacking element).

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface that includes transitioning the folder view of the folder to providing the free flow view depicting graphical representations within the user account of the content management system 106.

As illustrated in FIG. 1, the example environment also includes the server(s) 104. The server(s) 104 may generate, track, store, process, receive, and transmit electronic data, such as digital content items, account activity, interface elements, interactions with digital content items, and/or interactions between user accounts or client devices. For example, the server(s) 104 may receive data from the client device 108 in the form of file organizational patterns or more specifically, user account behavior. In addition, the server(s) 104 can transmit data to the client device 108 in the form updating the graphical user interface based on the file organization score, or some other information. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the content visualization system 102 as part of a content management system 106. The content management system 106 can communicate with the client device 108 to perform various functions associated with the client application 110 such as managing user accounts, managing content collections, managing content items, and facilitating user interaction with the content collections and/or content items. Indeed, the content management system 106 can include a network-based smart cloud storage system to manage, store, and maintain content items and related data across numerous user accounts. In some embodiments, the content visualization system 102 and/or the content management system 106 utilize the database 114 to store and access information such as digital content items, content attributes, content collections, and other information.

Although FIG. 1 depicts the content visualization system 102 located on the server(s) 104, in some implementations, the content visualization system 102 may be implemented by (e.g., located entirely or in part) on one or more other components of the environment. For example, the content visualization system 102 may be implemented by the client device 108, and/or a third-party device. For example, the client device 108 can download all or part of the content visualization system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the content visualization system 102, bypassing the network 112. As another example, the environment may include multiple client devices, each associated with a different user account for managing digital content items. In addition, the environment can include the database 114 located external to the server(s) 104 (e.g., in communication via the network 112) or located on the server(s) 104 and/or on the client device 108.

Figure 2:
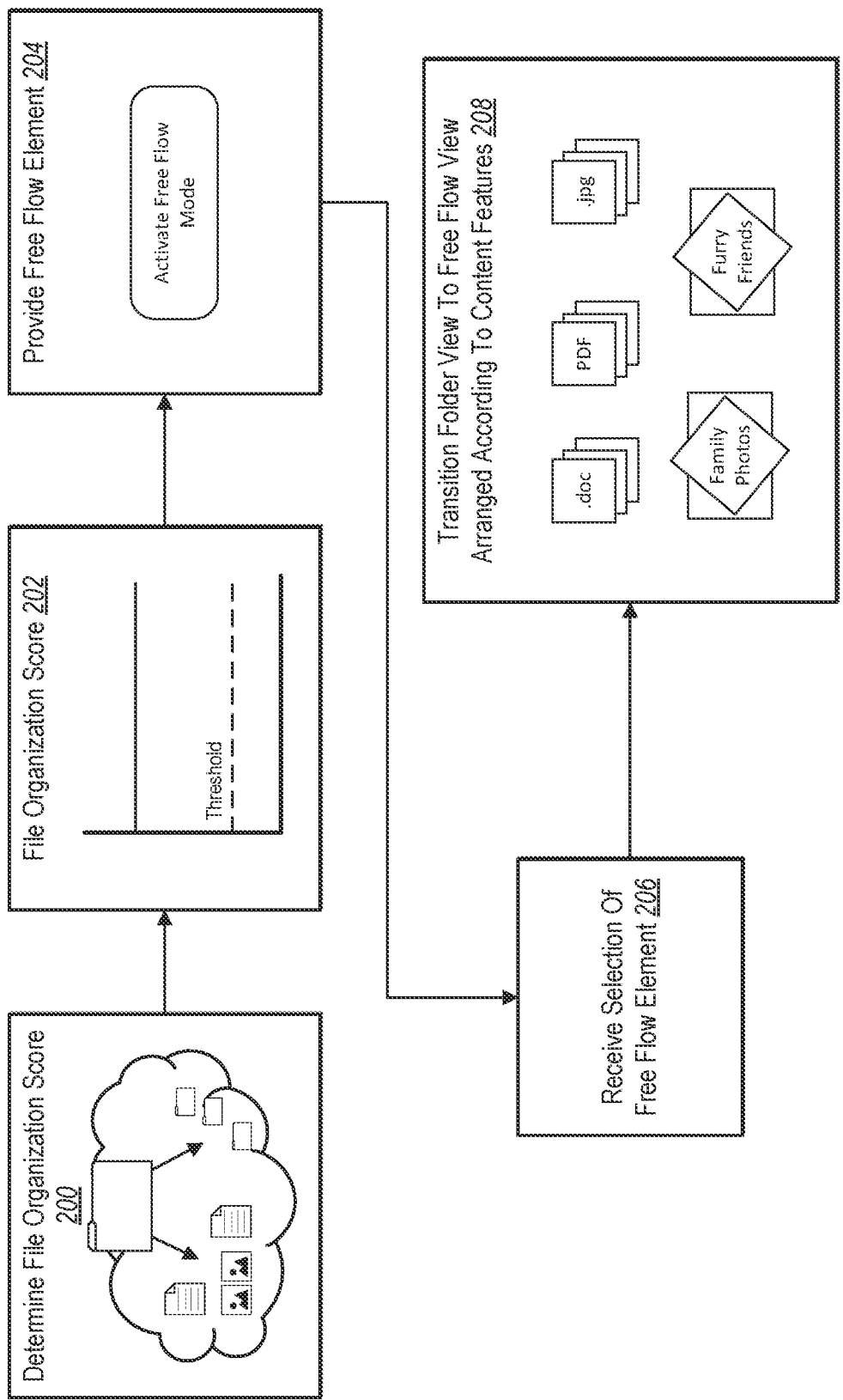
FIG. 2 illustrates an example diagram of transitioning from a folder view to a free flow view in accordance with one or more embodiments.

As mentioned above, the content visualization system 102 can provide a free flow view depicting a nonhierarchical view of graphical representations of content items of a user account of the content management system 106. In particular, the content visualization system 102 can provide the free flow view to a client device associated with a user account based on a file organization score. FIG. 2 illustrates an overview of determining a file organization score and transitioning from providing the folder view to the free flow view in accordance with one or more embodiments. Additional detail regarding the various acts of FIG. 2 is provided thereafter with reference to subsequent figures.

As illustrated in FIG. 2, in some embodiments, the content visualization system 102 transitions to the free flow view (or can provide an option to switch to the fee flow view) based on determining a file organization score. For example, FIG. 2 illustrates the content visualization system 102 performing an act 200. In particular, the act 200 includes determining the file organization score. For instance, the content visualization system 102 can perform the act 200 either i) automatically, ii) after a time threshold has been satisfied, iii) in response to certain actions by a client device, or iv) after a determined number of content items exist within a folder.

For example, the content visualization system 102 can perform the act 200 of determining the file organization score automatically. In particular, the content visualization system 102 can trigger a machine learning model to automatically determine the file organization score for a user account (or a folder in a user account) every few hours or days. For instance, after the creation of a user account, the content visualization system 102 can activate a machine learning model to determine the file organization score. Furthermore, the content visualization system 102 can activate an automatic determination of the file organization score upon the presence of at least one content item within the user account.

For example, the content visualization system 102 can perform the act 200 of determining the file organization score after a time threshold has been satisfied. In particular, the content visualization system 102 can establish a time threshold prior to triggering a machine learning model to perform the act 200. For instance, the content visualization system 102 can utilize a time threshold of a week, and once the threshold has been met, the content visualization system 102 can determine the file organization score. In utilizing time thresholds prior to performing the act 200, the content visualization system 102 can wait until the user account has a multitude of content items and/or folders and subfolders. In this manner, the file organizational patterns of the user account are reflected more accurately due to the content visualization system collecting user behavior data before determining the file organization score.

In addition or alternatively, the content visualization system 102 can perform the act 200 of determining the file organization score in response to certain actions. In particular, the content visualization system 102 can detect the performance of specific predetermined actions prior to performing the act 200. For instance, the content visualization system 102 can detect acts such as uploading a content item, creating subfolders, or transferring one or more content items to a different folder. Furthermore, based on the content visualization system 102 detecting one or more of the actions, the content visualization system 102 can perform the act 200 of determining the file organization score.

Furthermore, in some embodiments, the content visualization system 102 can perform the act 200 of determining the file organization score after a determined number of content items exist within a folder. In particular, the content visualization system 102 can set a predetermined number of content items as the threshold of content items within a folder. For instance, the content visualization system 102 can detect when fifty content items exist within a folder, and based on the detection, the content visualization system 102 triggers a machine learning model to perform the act 200 of determining the file organization score. More details regarding the specifics of how the content visualization system 102 determines the file organization score is given below in the description of FIG. 3.

As also shown, FIG. 2 illustrates the content visualization system 102 performing an act 202. For example, the act 202 includes determining whether the file organization score satisfies a threshold. In particular, the content visualization system 102 can utilize i) a numerical threshold, or ii) a threshold number of elements. Further, the content visualization system 102 after performing the act 202 can subsequently execute other actions in response to the file organization score satisfying the threshold.

For example, the content visualization system 102 in performing the act 202 can utilize the numerical threshold to determine whether the threshold is satisfied by the file organization score. For example, the numerical threshold can be a number such as 0.80. Based upon analyzing the folder, the machine learning model may determine the file organization score is 0.65. In this instance, 0.65 does not satisfy the numerical threshold of 0.80. Accordingly, the content visualization system 102 determines that the file organization score does not satisfy the numerical threshold.

For example, the content visualization system 102 in performing the act 202 can utilize the threshold of whether a number of elements are satisfied. In particular, the content visualization system 102 can determine the presence of certain content features. For example, the threshold can require no more than 1 subfolder, 2 different file types, and greater than 2 different types of digital content within content items associated with the folder. If the content visualization system 102 determines that these elements of content features are satisfied, then the content visualization system 102 determines that the file organization score satisfies the threshold. More specific details and examples of the content features and are given below in the description of FIG. 3. In other embodiments, the content visualization system 102 determines whether a folder is "organized" or "cluttered" based on a binary output from the machine-learning model. In other words, the output of the machine learning model can be a 1 or a 0, with a 1 indicating that the folder is "organized" and a 0 indicating that the folder is "cluttered."

As also shown, FIG. 2 illustrates the content visualization system 102 performing an act 204. For example, the act 204 includes providing a free flow element within a graphical user interface. In particular, the content visualization system 102 can perform the act 204 in response to the file organization score satisfying the threshold. For instance, providing the free flow element includes visually displaying the free flow element within the graphical user interface of the user account so that a user can provide a user interaction to indicate a selection of the free flow element.

For example, the content visualization system 102 performs the act 204 by providing the element in a banner within the graphical user interface. In particular, the free flow element appears in a banner at the top of the graphical user interface and is highlighted in a manner to grab the attention of a user of the user account. As another example, the content visualization system 102 performs the act 204 of providing the element in an overlaid window. In particular, the content visualization system 102 overlays a window over the graphical user interface. In doing so, the content visualization system 102 also provides an option for dismissing the free flow element or selecting the free flow element.

As FIG. 2 further illustrates, the content visualization system 102 can receive an indication of a user selection of the free flow element in act 206. Specifically, the act 206 includes receiving an indication of a user selection of the free flow element. In particular, based on receiving a selection of the free flow element, the content visualization system 102 can execute actions and provide additional graphical user interface displays. For example, and as FIG. 2 illustrates, the content visualization system 102 performs an action in response to receiving the selection of the free flow element. For instance, FIG. 2 illustrates the content visualization system 102 performing the act 208 that includes transitioning from providing the folder view to providing the free flow view. For instance, the content visualization system 102 can perform the act 208 of switching from providing the folder view to providing the free flow view in response to receiving a selection of the free flow element. More details of the free flow view are given below in the description of FIG. 4.

Figure 3:
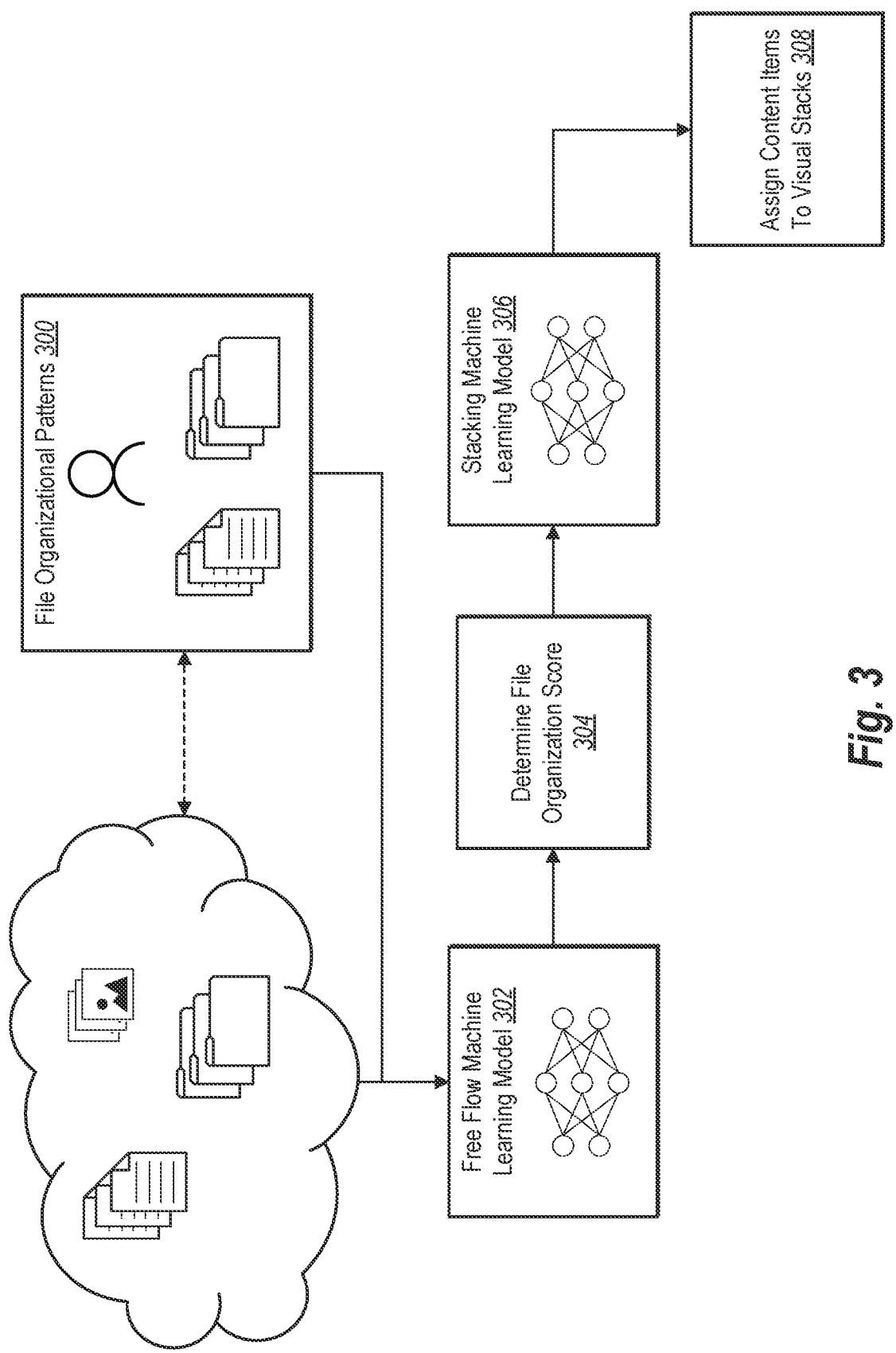
FIG. 3 illustrates an example diagram for determining a file organization score and assigning content items to a visual stack in accordance with one or more embodiments.

As mentioned above, the content visualization system 102 determines a file organization score. As illustrated in FIG. 3, the content visualization system 102 determines file organizational patterns 300 and utilizes a free flow machine learning model 302 to determine the file organization score 304. For example, the content visualization system 102 determines file organizational patterns 300 by monitoring one or more folders of the user account of the content management system. In particular, the content visualization system 102 monitors the folders of the user account to detect user account behaviors and properties within the folders. For instance, as mentioned previously, the content visualization system 102 can determine i) the number of content items, ii) the number of subfolders, iii) the movement of content items, iv) the content item names, v) the content item types, and/or vi) the digital content within content items. Further, these determinations made by the content visualization system 102 are indicative of file organizational patterns 300, and the content visualization system 102 can make further determinations by feeding, as input, the file organizational patterns 300 to a machine learning model.

In some examples, the content visualization system 102 determines a number of content items. In particular, the content visualization system 102 performs a summation operation to calculate the number of content items within a folder. For instance, in response to determining the number of content items within a folder, the content visualization system 102 passes the number to a machine learning model. As an example, the greater the number of content items within a folder acts as an indicator to the content visualization system 102 that the user account has potential file organizational patterns that tends towards disorganization (e.g., deviates from traditional file organization structure).

In addition to determining a number of content items in a folder, the content visualization system 102 can determine the number of subfolders by performing a summation operation for the number of subfolders within a specific folder. In particular, determining the number of subfolders in an account also includes determining the absence of subfolders. For instance, the content visualization system 102 calculates the number of subfolders and passes this number to a machine learning model. Moreover, when the content visualization system 102 determines a low number of subfolders, this potentially indicates to the content visualization system 102 of file organizational patterns 300 indicative of disorganization.

In addition to determining the number of subfolders, the content visualization system 102 determines the movement attributes associated with content items. In particular, movement attributes of content items can include monitoring an initial placement of a content item within a folder and a subsequent transfer of the content item to a different folder or subfolder. Further, the movement attributes of content items can include the initial assignment of a content item within a folder, and later reassigning the content item to a subfolder within the initially assigned folder. For example, the content visualization system 102 can determine that a high number of movements of content items indicates a potential tendency towards disorganization and likely, a user of the user account views traditional file storage hierarchies as a burden. To illustrate, the content visualization system 102 utilizes a data table with initial content item locations and subsequent content item locations. Based on the data table, the content visualization system 102 identifies movement attributes of content items and passes the movement attributes to the machine learning model as input.

In addition to determining movement attributes, the content visualization system 102 determines the content item names. In particular, the content visualization system 102 determines the content item names within the same folder. For instance, the content visualization system 102 performs an action of analyzing content item names with a string reading operation. In some embodiments, the content visualization system 102 receives the list of content item names within a folder and analyzes the content item names. For example, the content visualization system 102 analyzes the content item names for similarity. In particular, the content visualization system 102 determines a similarity score between content item names. To illustrate, if the content items within a folder include "receipts" and "dog pictures" the content visualization system 102 determines a low similarity score. On the other hand, if the content items within a folder include "chihuahua" and "shih tzu", the content visualization system 102 determines a high similarity score. Furthermore, a low similarity score indicates to the content visualization system 102 a potential tendency towards disorganization.

In addition to using content item names, the content visualization system 102 determines the content item types. In particular, the content visualization system 102 determines types of content items, such as pdf, png, jpeg, pptx, docx, etc. For instance, the content visualization system 102 determines the content item types for determining the diversity of file types within the folder. Generally, for folders with many different content item types, the content visualization system 102 determines a potential tendency towards disorganization.

In one or more embodiments, the content visualization system 102 analyzes the digital content within content items for purposes of determining a file organization score. In particular, the content visualization system 102 determines digital content within content items utilizing a machine learning model. In some embodiments, the content visualization system uses machine learning models to parse digital images, texts, or other content within content items to determine a category of the digital content within content items. For example, the content visualization system can provide each content item to a content classifier machine learning model and associate each content item with a content category based on the content classifier. For instance, the content visualization system 102 then uses the content category assigned to each content item to determine a similarity between digital content within content items of a folder. To illustrate, if the content items include dogs in one content item and cats in another content item, the content visualization system 102 can generate a high similarity score. On the other hand, if the content items include a dog in one content item and a car in another content item, the content visualization system 102 can generate a low similarity score. Furthermore, in some instances where there are multiple content items and various digital content within each content item, the content visualization system 102 aggregates similar content items together and compares the digital content of similar content items to other sets of aggregated content items. If the content visualization system 102 determines a low similarity score between content items (or sets of content items), this potentially indicates to the content visualization system 102 a tendency towards disorganization.

As discussed above, the content visualization system 102 passes file organizational patterns 300 to a machine learning model. For example, the content visualization system 102 passes the file organizational patterns 300 to a free flow machine learning model 302, as shown in FIG. 3. In particular, the content visualization system 102 receives as inputs the file organizational patterns 300 (e.g., content features). The content visualization system 102 can utilize the machine learning model to determine the file organization score 304 by inputting the file organizational patterns 300 into the machine learning model. For example, the machine learning model can receive the file organizational patterns 300 that potentially indicate a tendency towards disorganization. As already mentioned above, features such as a high number of content items within a folder, a low number of subfolders, dissimilarity between content items, dissimilarity between content item types, etc. indicate a potential tendency towards disorganization. In particular, the content visualization system 102 can utilize the machine learning model to analyze user account behavior and can encode information associated with the file organizational patterns 300, (e.g., using one hot encoding, an encoding layer, or a vector mapping) and then process the encoding utilizing the machine learning model to determine the file organization score 304.

As mentioned above, the content visualization system 102 receives via the free flow machine learning model 302 file organizational patterns 300. For example, the content visualization system 102 assigns predetermined weights to each of the above-discussed file organizational patterns. Based on the assigned weight, the free flow machine learning model determines the file organization score 304. To illustrate, the content visualization system 102 can assign weights as follows: i) [0.25] the number of content items, ii) [0.20] the number of subfolders, iii) [0.25] the movement of content items, iv) [0.10] the content item names, v) [0.10] the content item types, and/or vi) [0.10] the digital content within content items. Furthermore, the assigned weight determines the importance associated with the file organizational pattern when determining the file organization score 304. Based on the machine learning principles discussed above, the machine learning model receives the file organizational patterns 300 (e.g., the content features) with the assigned weights and determines the file organization score 304.

As further shown, FIG. 3 illustrates the content visualization system 102 further utilizing a stacking machine learning model 306. For example, after determining the file organization score 304, the content visualization system 102 can then determine to provide a free flow view for the folder, and within that view, the content visualization system can generate visual stack categories. For instance, after utilizing the stacking machine learning model 306, the content visualization system 102 can perform an act 308 of assigning content items to visual stacks.

Figure 4:
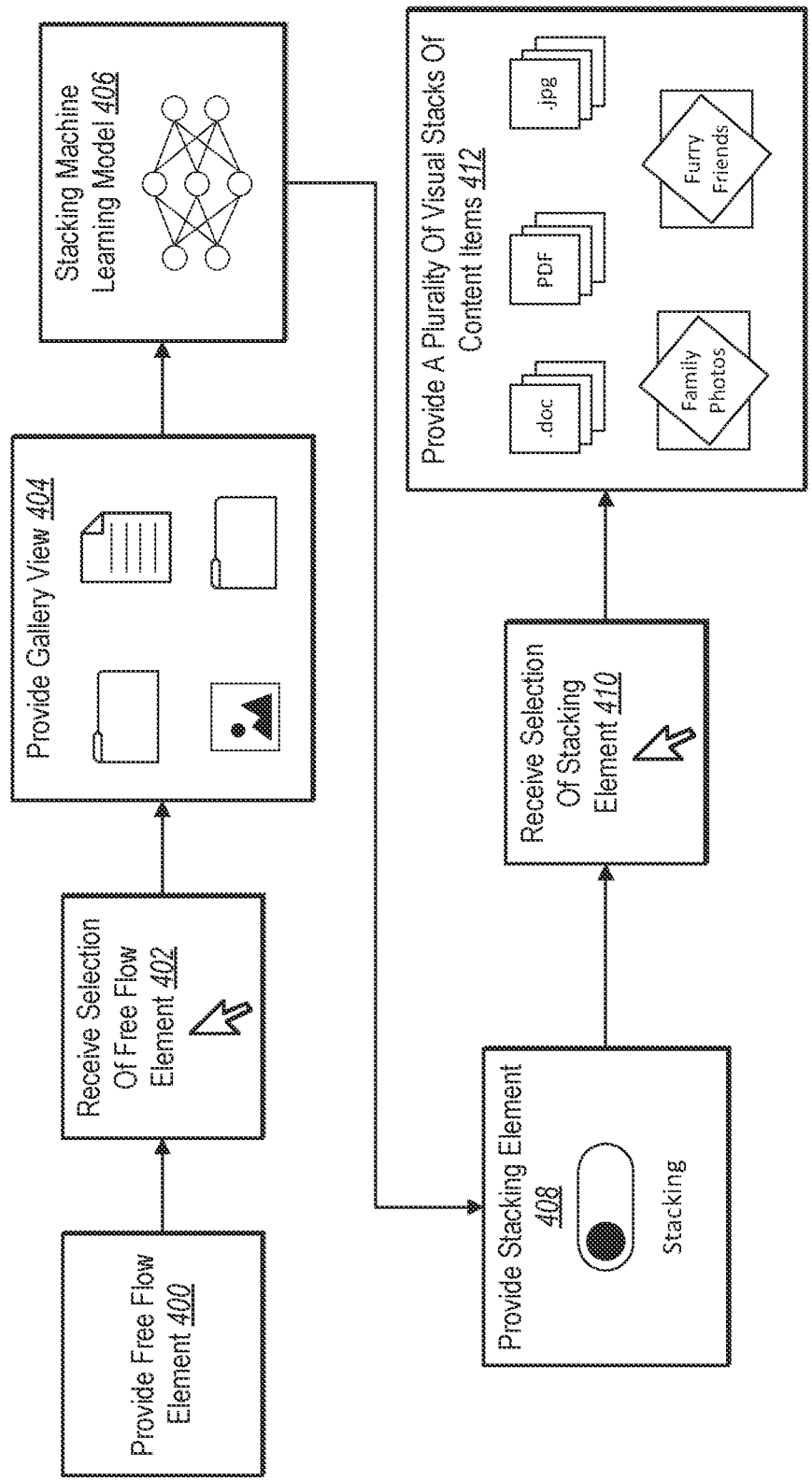
FIG. 4 illustrates an example diagram for providing a plurality of visual stacks of content items in accordance with one or more embodiments.

More specifically, FIG. 4 illustrates the content visualization system 102 generating and providing a plurality of visual stacks. For example, FIG. 4 illustrates the content visualization system 102 performing an act 400. In particular, the act 400 includes providing the free flow element (e.g., based on determining a file organization score that exceeds a threshold). The act 400 was similarly discussed above in relation to FIG. 2. Here, FIG. 4 similarly illustrates the content visualization system 102 providing the free flow element and performing an act 402 of receiving an indication of a user selection of the free flow element.

FIG. 4 further illustrates an act 404. For example, the act 404 includes the content visualization system 102 providing a free flow view that includes a gallery format within the graphical user interface. In particular, the content visualization system 102 transitions from the folder view of the content items to the free flow view of the content items. For instance, the content visualization system 102 initially provides a graphical user interface that includes all of the content items in a gallery view in response to a selection of the free flow element. Furthermore, the content visualization system 102 causes the client device associated with the user account to display the gallery view based on receiving an indication of a user selection of the free flow element at the client device.

As further illustrated in FIG. 4, in response to a selection of the free flow element, the content visualization system 102 utilizes the stacking machine learning model to determine visual stacks and orders of content items within the visual stacks. For example, the stacking machine learning model receives as inputs the file organizational patterns and content features of the user account. In particular, the content visualization system 102, via the stacking machine learning model, receives the previously content features and attributes. Note that at this point the content visualization system 102 utilizes the stacking machine learning model 406 but has not yet visually displayed visual stacks.

For example, the stacking machine learning model 406 receives the file organizational patterns as inputs and generates a determination for categories of visual stacks. In particular, the stacking machine learning model can determine to generate visual stacks based on i) content item type, ii) content item names, iii) digital content within content items, iv) date created, and/or v) frequency of use. For instance, the stacking machine learning model 406 can receive as inputs the file organizational patterns and determine that the type of content item provides the best organization for the visual stacks. Based on that determination, the content visualization system 102 can generate visual stacks based on content item type.

As illustrated by FIG. 4, after utilizing the stacking machine learning model 406, the content visualization system 102 can perform an act 408. For example, the act 408 includes providing a stacking element within the graphical user interface. In particular, the content visualization system 102 provides the stacking element in a similar manner as providing the free flow element. To illustrate, the content visualization system 102 provides the stacking element as a toggle within the graphical user interface that indicates that upon selection, the content visualization system 102 will further customize the free flow view from a gallery format into a visual stack format.

FIG. 4 further shows the content visualization system 102 performing an act 410. For example, act 410 includes receiving a selection of the stacking element. In particular, receiving an indication of a user selection of the stacking element includes a client device selecting the stacking element by toggling the element "on." As further shown by FIG. 4, the content visualization system 102, in response to the act 410 of receiving the selection of the stacking element, performs an act 412 that includes providing a plurality of visual stacks of content items. In particular, the content visualization system 102 causes the client device to present the content items previously shown in the gallery view in a plurality of visual stacks based on a determination by the stacking machine learning model 406. For instance, as discussed above, the stacking machine learning model 406 makes a determination of visual stack categories and based on that determination, and in response to a selection of the stacking element, the content visualization system 102 provides the visual stacks within the graphical user interface.

Although FIG. 4 illustrates a certain method and process for providing the plurality of visual stacks, in one or more embodiments, the content visualization system 102 can perform the act 412 of providing a plurality of visual stacks of content items in a different manner. For example, rather than providing the stacking element, the content visualization system 102 can in response to utilizing the stacking machine learning model 406 automatically provide the plurality of visual stacks of content items within the free flow view.

Figure 5:
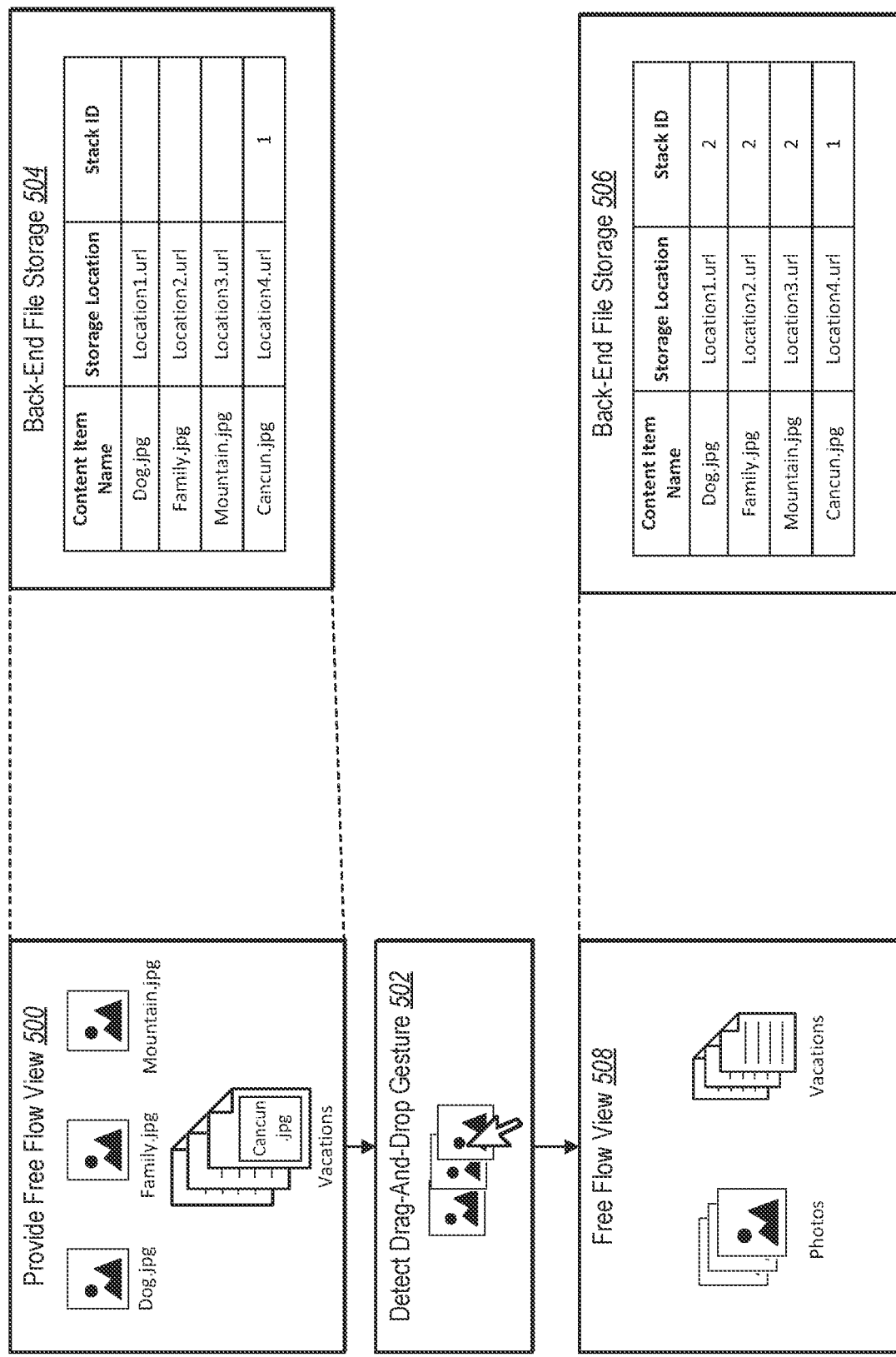
FIG. 5 illustrates an example diagram for maintaining a back-end file storage hierarchical structure for the folder while providing the free-flow view in accordance with one or more embodiments.

As mentioned above, the content visualization system 102 maintains a back-end file storage hierarchical structure. For example, FIG. 5 illustrates the content visualization system 102 providing a display of visual stacks for content items while maintaining a back-end file storage hierarchical structure. As illustrated in FIG. 5, the content visualization system 102 can provide a free flow view 500. For instance, the free flow view 500 depicts singular content items (i.e., dog.jpg, family.jpg, and mountain.jpg), and the free flow view 500 also depicts cancun.jpg within a visual stack labeled vacations.

As shown by FIG. 5, the free flow view 500 also has a corresponding back-end file storage data structure. For example, the back-end file storage 504 includes each of the content items shown in the free flow view 500. In particular, the back-end file storage 504 further shows a data table with each of the content items and a corresponding storage location and stack identifier. For instance, the back-end file storage 504 shows dog.jpg at storage location location1.url, family.jpg at location2.url, mountain.jpg at location3.url, and cancun.jpg at location4.url. Furthermore, the back-end file storage 504 also depicts a stack identifier of "1," which indicates cancun.jpg within the first visual stack (e.g., the vacation visual stack has "1" as the identifier). Accordingly, with cancun.jpg, the content visualization system 102 visually displays cancun.jpg as part of a visual stack however the content visualization system 102 maintains a file organization hierarchy within the back-end as shown by the storage location.

As further shown by FIG. 5, the content visualization system 102 can detect a drag-and-drop gesture 502. The drag-and-drop gesture 502 was discussed previously, and the same principles apply here. In this instance, FIG. 5 shows a detection of the drag-and-drop gesture 502 of the jpg images into a single visual stack. In particular, FIG. 5 illustrates dragging and dropping the dog.jpg, the family.jpg, and the mountain.jpg into a single visual stack.

Moreover, FIG. 5 illustrates free flow view 508 that results from the drag-and-drop user interaction. For example, free flow view 508 differs from free flow view 500 in that the content visualization system 102 provides two visual stacks. In particular, FIG. 5 shows a photos visual stack and a vacations visual stack. In addition, the free flow view 508 also has a corresponding back-end file storage 506. For instance, FIG. 5 illustrates an updated back-end file storage 506. As shown, each of the storage locations for the content items remain the same but the content items dog.jpg, family.jpg, and mountain.jpg now have a corresponding stack ID of "2" indicating they are now assigned to the same stack. For instance, because the content visualization system 102 considers the vacations visual stack as the first visual stack, the content visualization system 102 considers the photos visual stack as the second visual stack. Accordingly, the content visualization system 102 updates the data table for the back-end file storage 506 by assigning the metadata the appropriate visual stack identifier.

Figure 6A:
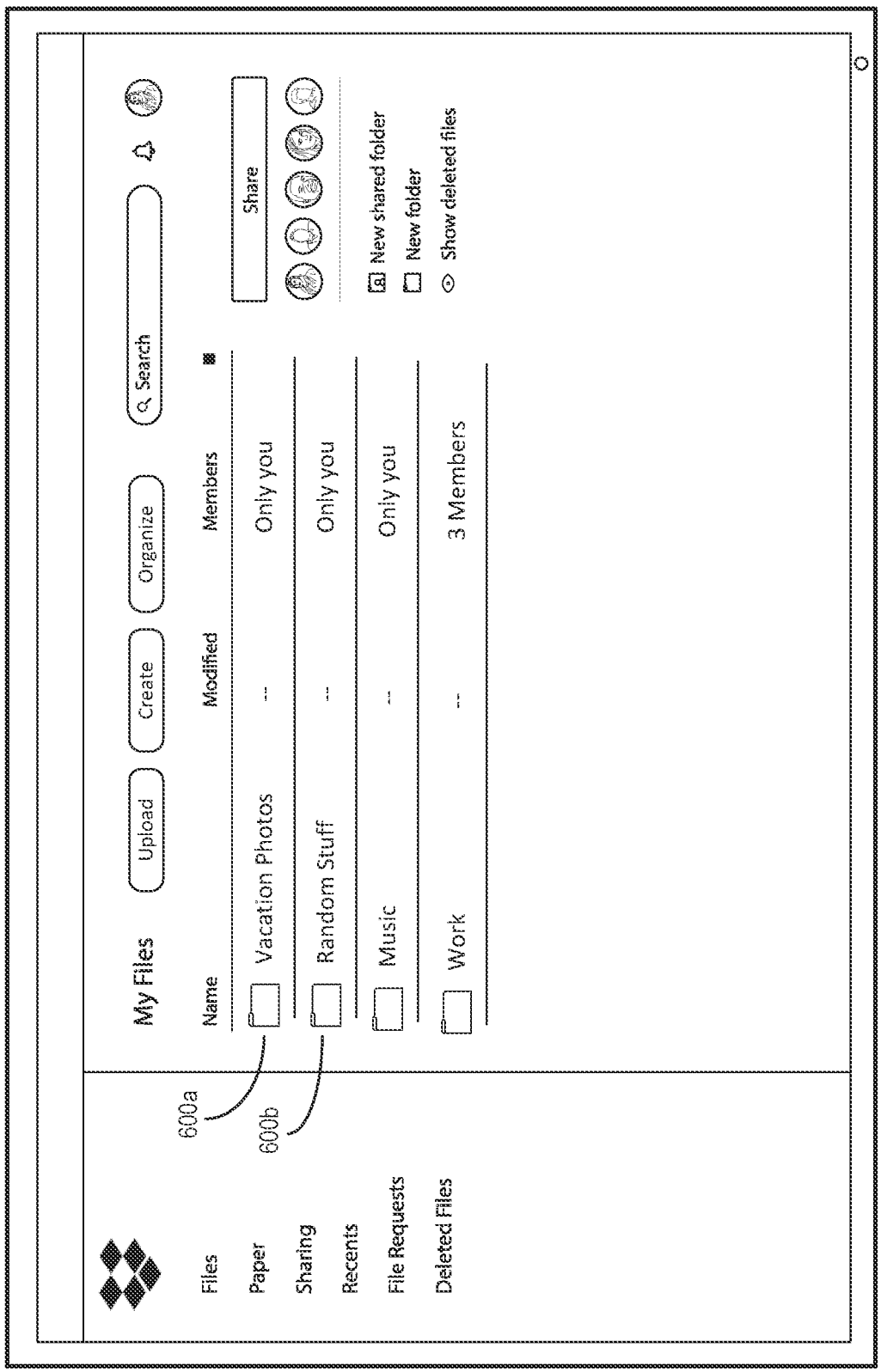
FIG. 6A illustrates an example graphical user interface for displaying folders in accordance with one or more embodiments.

FIGS. 6A-6K illustrate a variety of example graphical user interfaces that depict displaying a folder view, displaying a free flow view and various embodiments of the free flow view. For example, FIG. 6A illustrates a graphical user interface with a file organization hierarchy. In particular, FIG. 6A illustrates a graphical user interface of a user account in the folder view, e.g., the traditional folder organizational structure, as discussed previously. For instance, FIG. 6A shows a vacation photos folder 600a and a random stuff folder 600b.

Figure 6B:
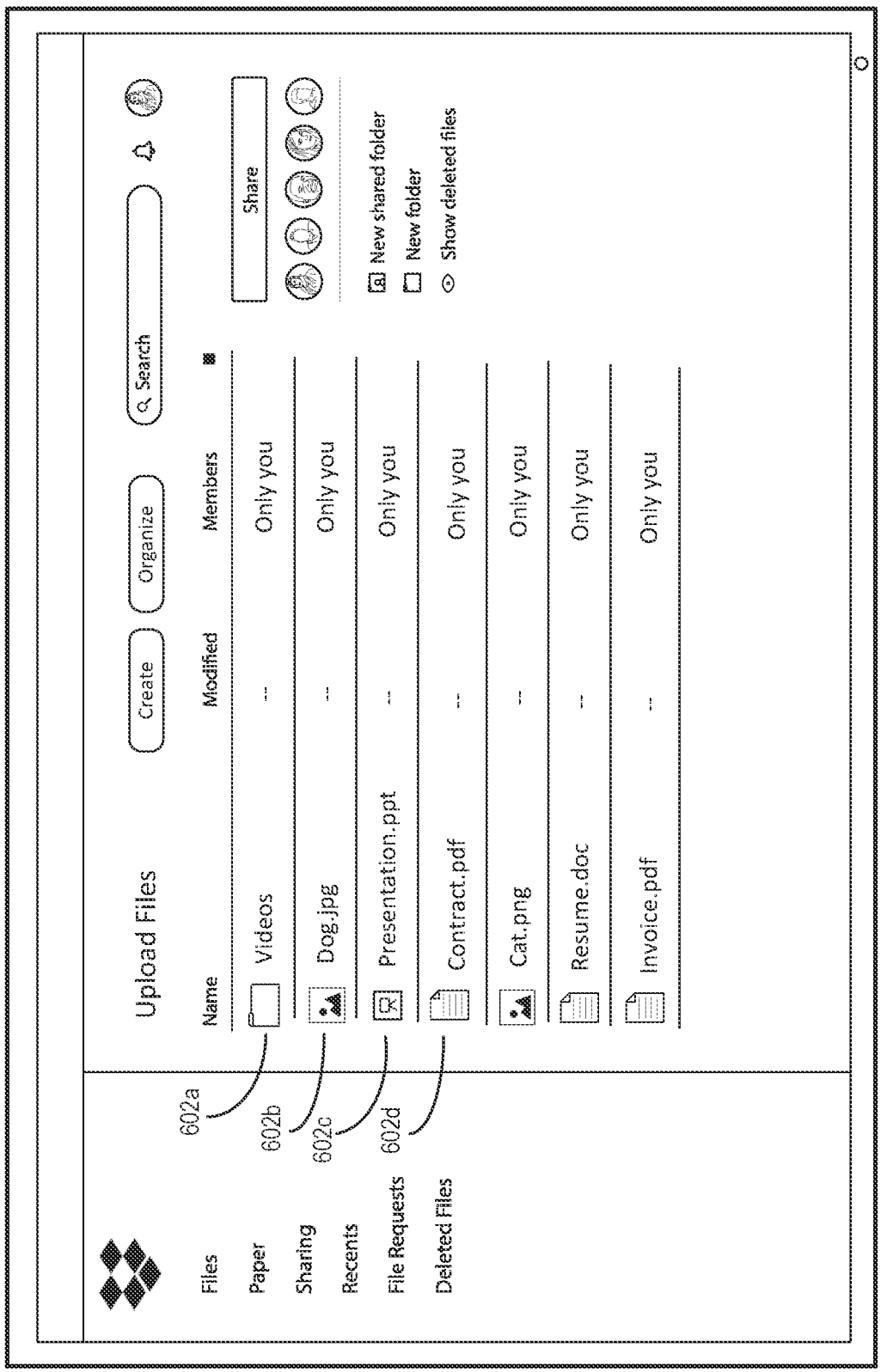
FIG. 6B illustrates an example graphical user interface of a random assortment of file types in accordance with one or more embodiments.

FIG. 6B illustrates an example graphical user interface of content items within a folder. For example, FIG. 6B shows a visual of selecting a folder of the user account and the corresponding content items contained within the folder. In particular, FIG. 6B shows a subfolder videos 602a, a jpg content item dog 602b, a ppt content item presentation 602c, and a pdf content item contract 602d. Thus, FIG. 6B illustrates a graphical user interface display with a variety of content item types. As previously mentioned, the content visualization system 102 can utilize various machine learning models to determine a file organization score for the content items within the folder shown in FIG. 6B.

Figure 6C:
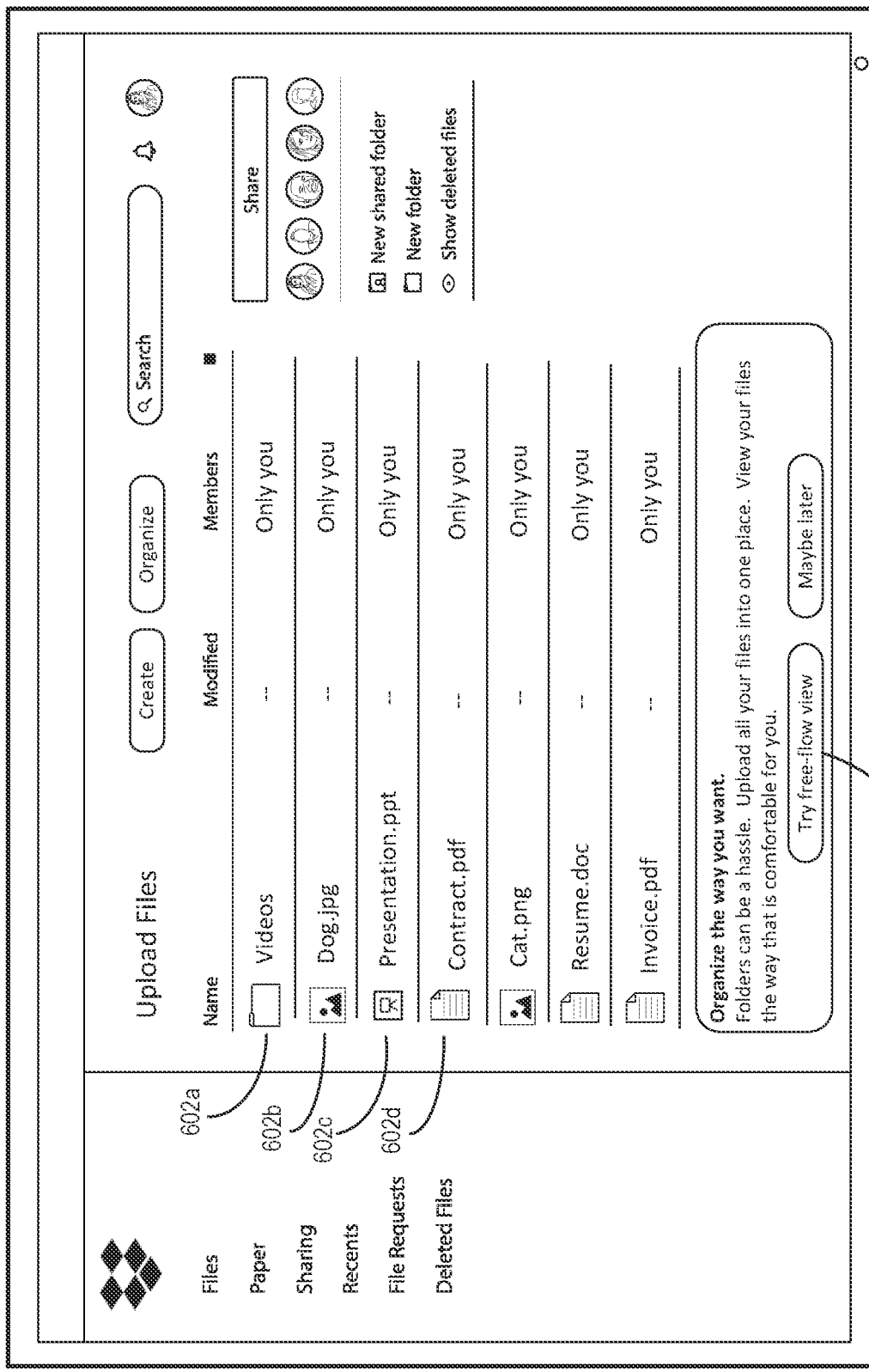
FIG. 6C illustrates an example graphical user interface of providing a free flow element in accordance with one or more embodiments.

As shown in FIG. 6C, the content visualization system 102 determines a file organization score for the content items and based on the file organization score satisfying a threshold (discussed above), the content visualization system 102 provides a free flow element 604. In particular, the content visualization system 102 provides the free flow element 604 that indicates to the user account that selection of the element activates the free flow view. Specifically, as mentioned previously, the file organization score can indicate that a user of a user account has a tendency towards disorganization. For instance, the notification encompassing the free flow element 604 indicates "folders can be a hassle. Upload all your files into one place. View your files the way that is comfortable for you." Further, the content visualization system 102 also provides an option for the user of the user account to dismiss the option to try the free flow view.

Figure 6D:
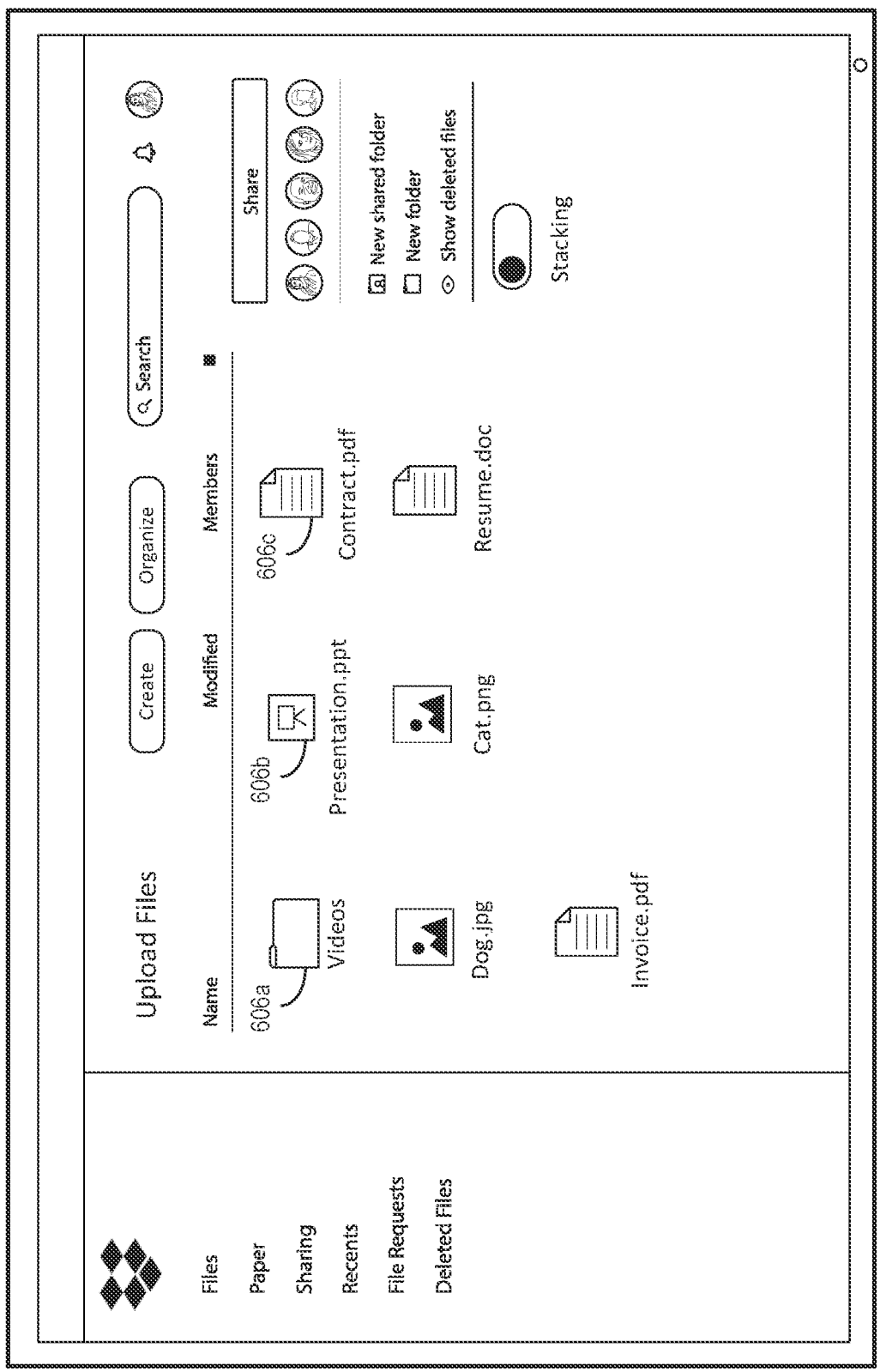
FIG. 6D illustrates an example graphical user interface of providing a grid view of a variety of pictures and files in accordance with one or more embodiments.
Figure 6E:
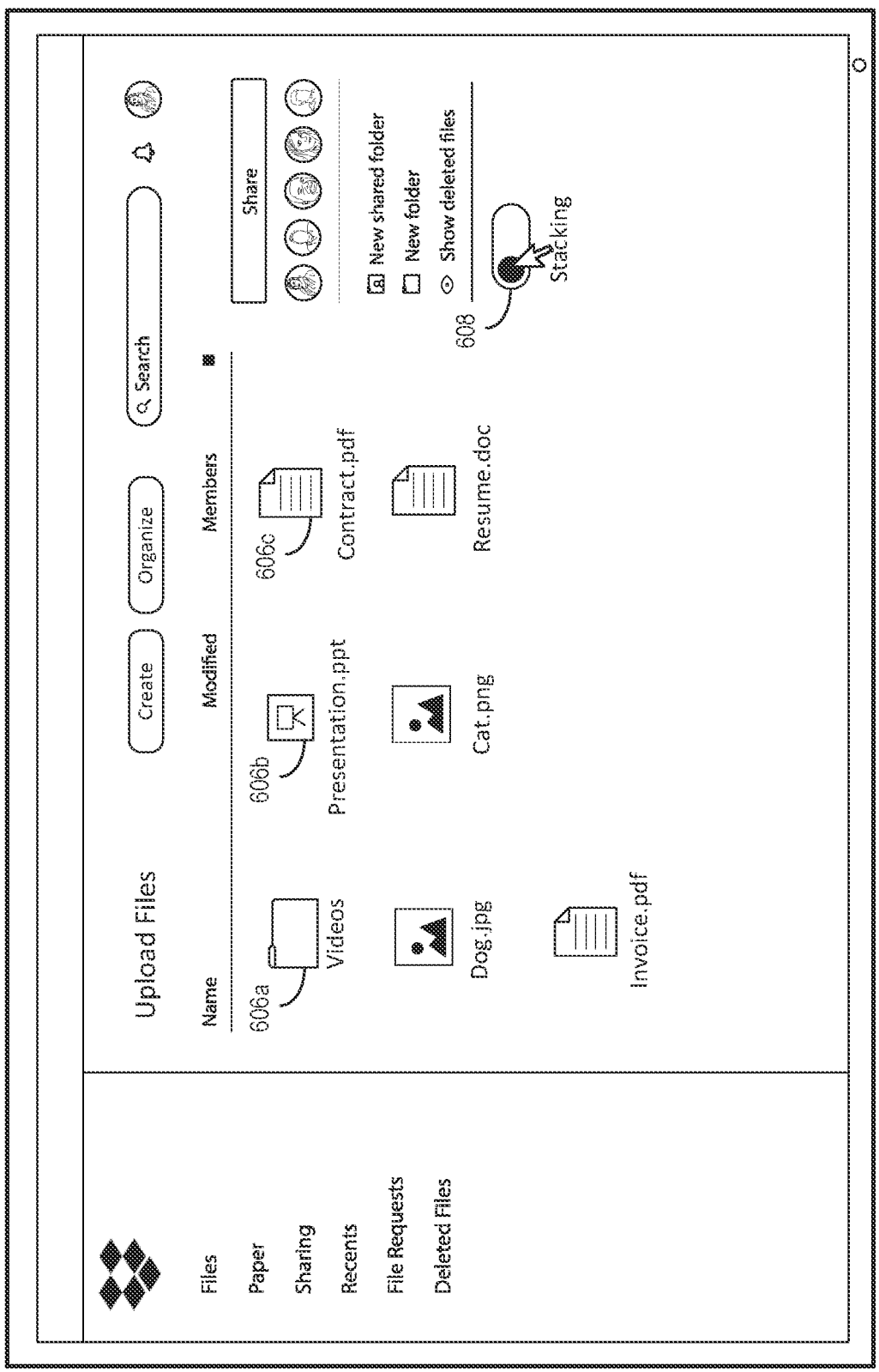
FIG. 6E illustrates an example graphical user interface of providing a stacking element in accordance with one or more embodiments.

As shown, FIG. 6D illustrates the content visualization system 102 displaying the free flow view in response to selection of the free flow view in FIG. 6C. For example, FIG. 6D depicts the content items within the folder in a grid-view, rather than a folder view. For instance, FIG. 6D illustrates a folder of videos 606a, a presentation.ppt 606b, and a contract.pdf as 606c. Furthermore, FIG. 6D also indicates a stacking element. Selection of the stacking element activates visual stacks within the graphical user interface. As shown, FIG. 6E illustrates a stacking element 608. In particular, FIG. 6E shows a selection of the stacking element 608.

Figure 6F:
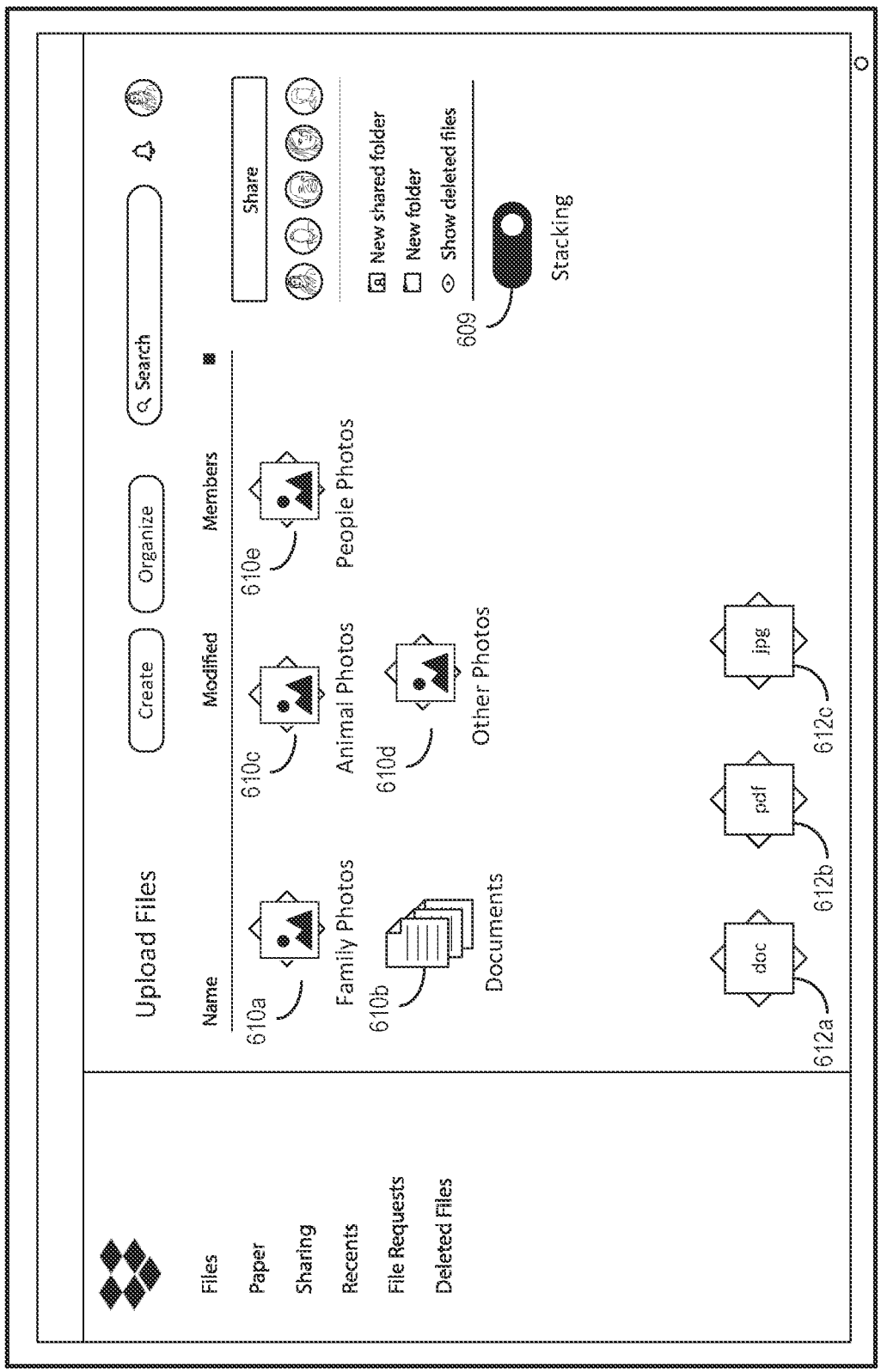
FIG. 6F illustrates an example graphical user interface of providing a visual stack of content items in accordance with one or more embodiments.

Furthermore, FIG. 6F illustrates the content visualization system 102 displaying visual stacks. For example, FIG. 6F shows an activated stacking element 609 and various stacks. In particular, FIG. 6F shows visual stacks for family photos 610a, animal photos 610c, other photos 610d, people photos 610e, and documents 610b. Additionally, FIG. 6F also illustrates visual stacks 612a-612c, e.g., doc visual stack 612a, pdf visual stack 612b, and jpg visual stack 612c. As previously discussed, the content visualization system 102 utilizes a stacking machine learning model to determine visual stack categories. In doing so, FIG. 6F illustrates the visual stacks grouped based on identified categories.

Figure 6G:
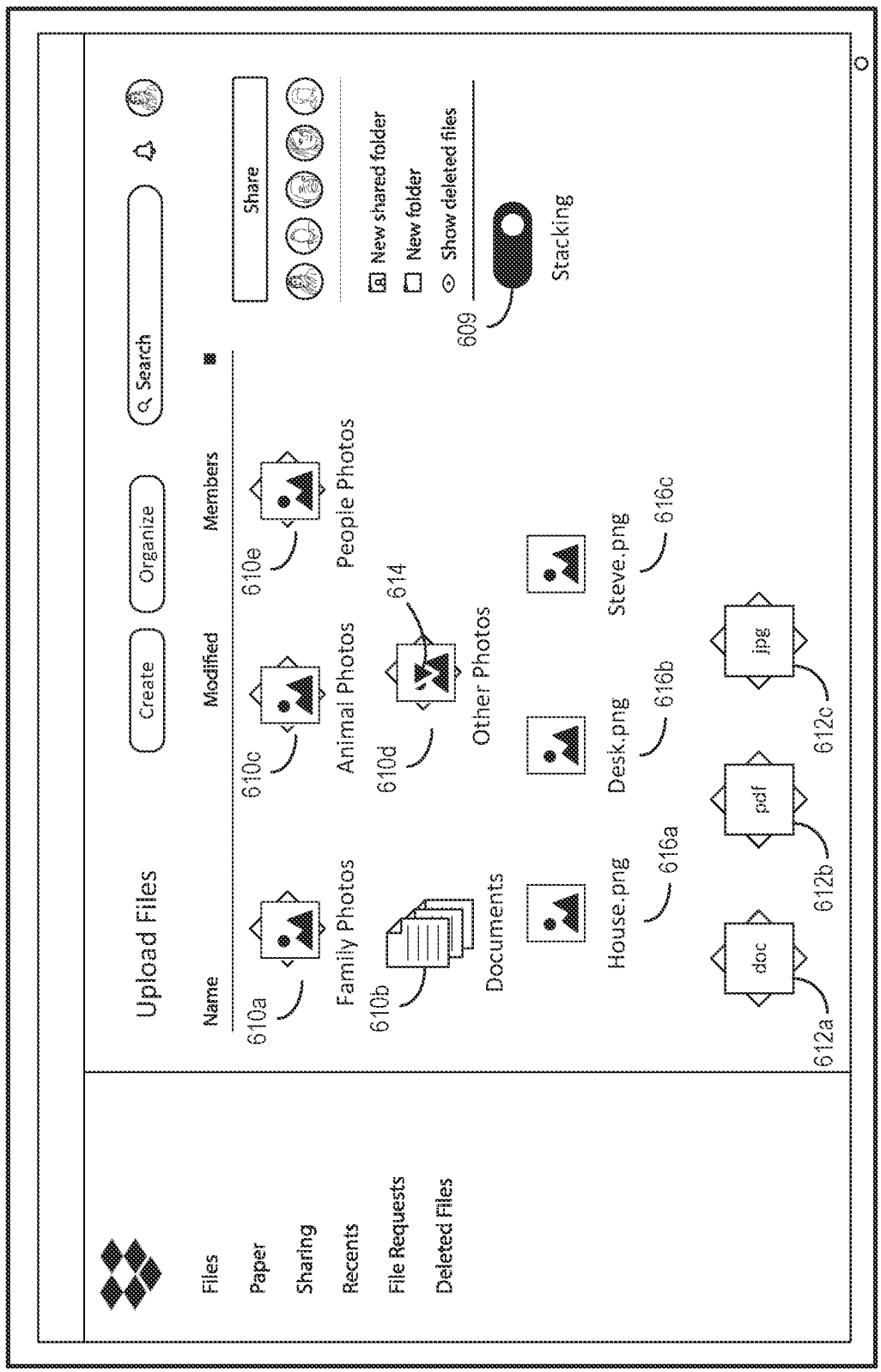
FIG. 6G illustrates an example graphical user interface of providing a set of content items from a visual stack of content items without navigating away from the display in accordance with one or more embodiments.

FIG. 6G illustrates the content visualization system 102 displaying visual stacks and individual content items part of a visual stack. For example, FIG. 6G illustrates a visual stack expansion element 614. In particular, FIG. 6G shows a selection of the visual stack other photos 610d and in response to this selection, the content visualization system 102 shows the visual stack expansion element 614 and individual content items part of the visual stack other photos 610d. Specifically, the content items part of the visual stack include house.png 616a, desk.png 616b, and steve.png 616c. In addition, as previously discussed, the content visualization system 102 expands the selected visual stack to show content items without navigating to another page.

Figure 6H:
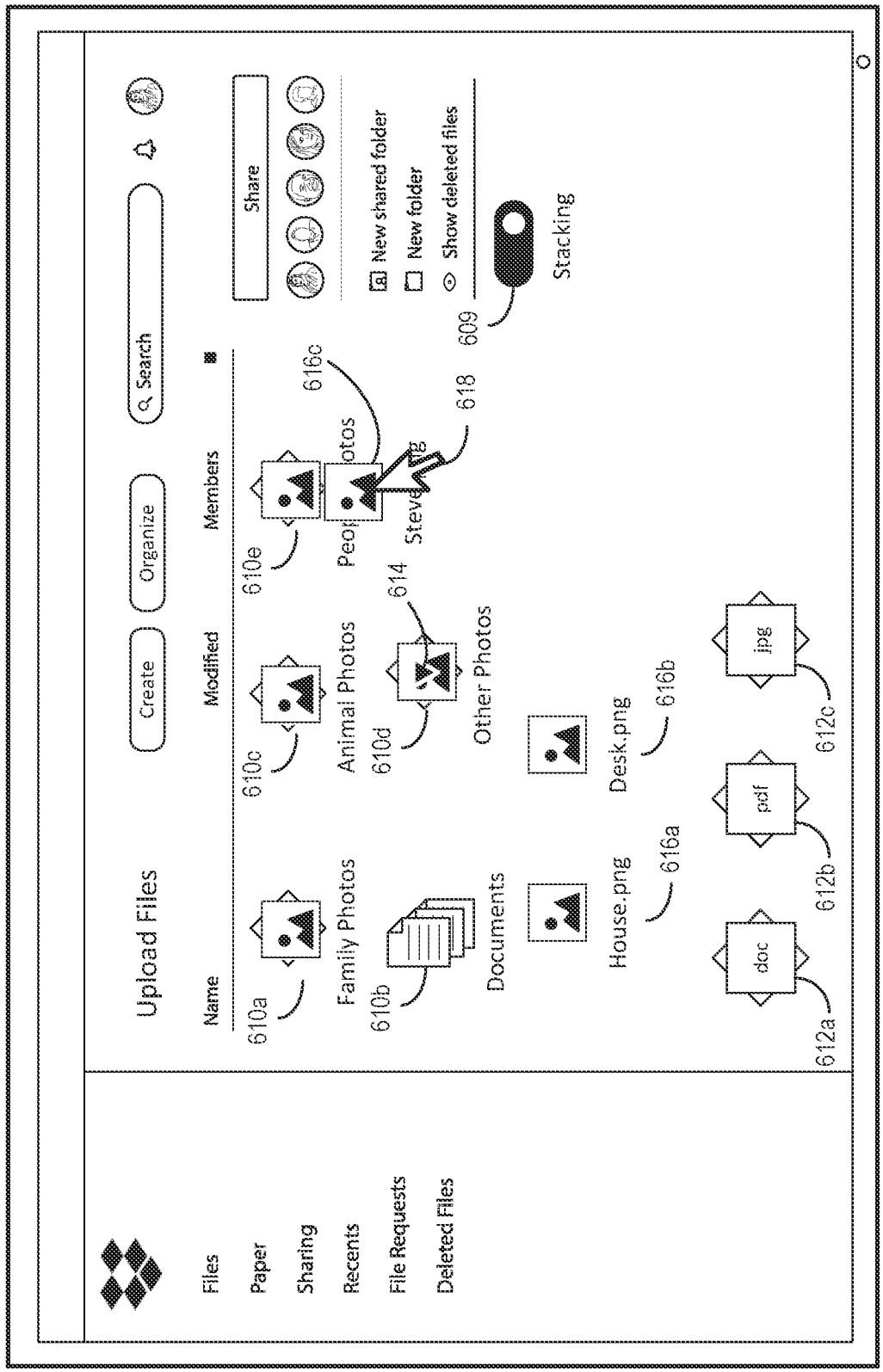
FIG. 6H illustrates an example graphical user interface of dragging-and-dropping a content item to a visual stack in accordance with one or more embodiments.

As shown, FIG. 6H illustrates the dragging and dropping of a content item from one visual stack to another visual stack. For example, FIG. 6H shows a selection 618 of steve.png 616c and a drag-and-drop gesture of steve.png 616c to the people photos 610e visual stack. In particular, as a result of dragging and dropping steve.png 616c to the people photos 610e visual stack, the content visualization system 102 assigns steve.png 616c to people photos 610e. For instance, visually, steve.png 616c is part of people photos 610e and the content visualization system 102 updates the metadata column for stack ID to match the people photos 610e visual stack ID.

Figure 6I:
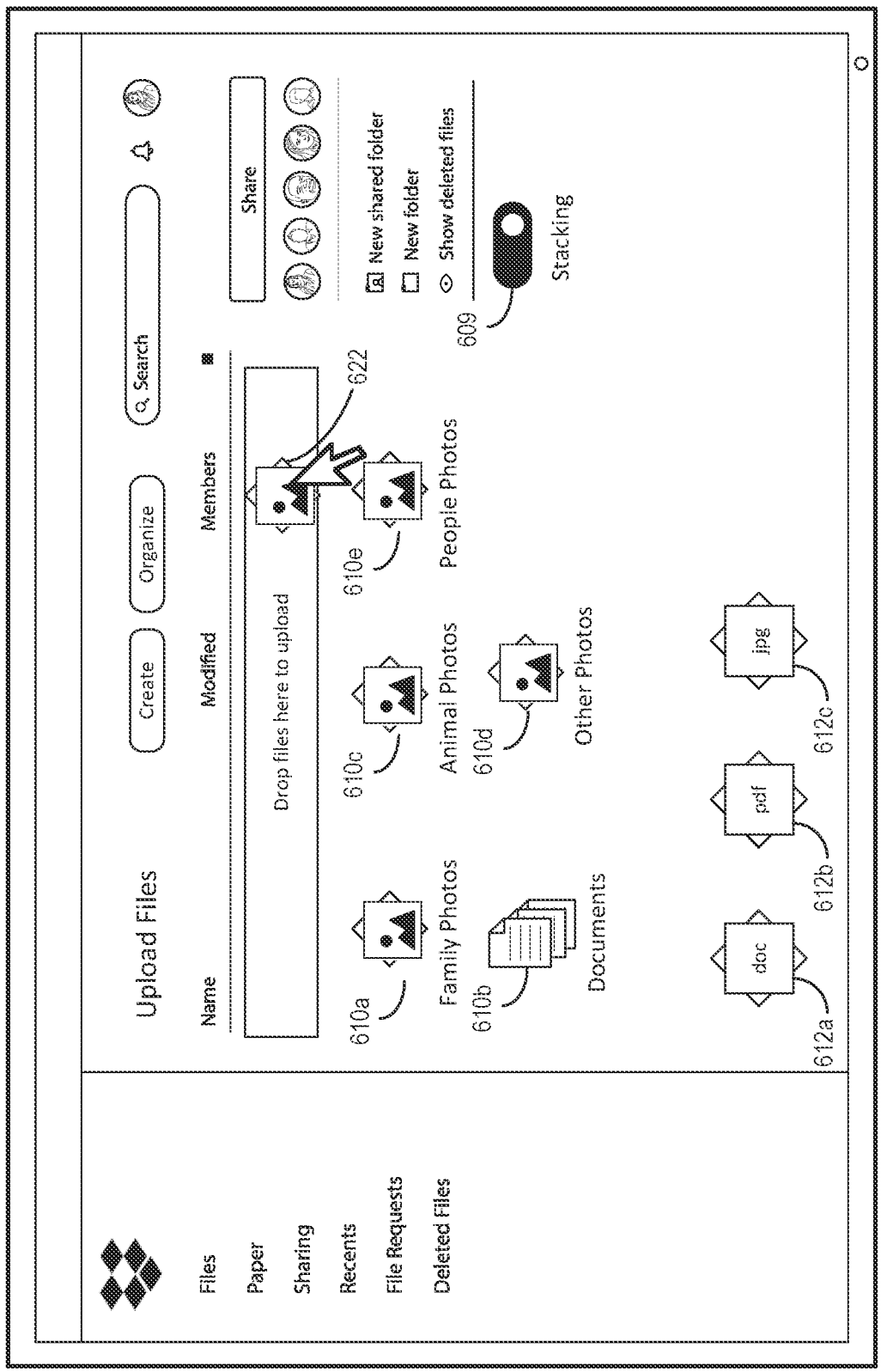
FIG. 6I illustrates an example graphical user interface of uploading multiple content items in accordance with one or more embodiments.
Figure 6J:
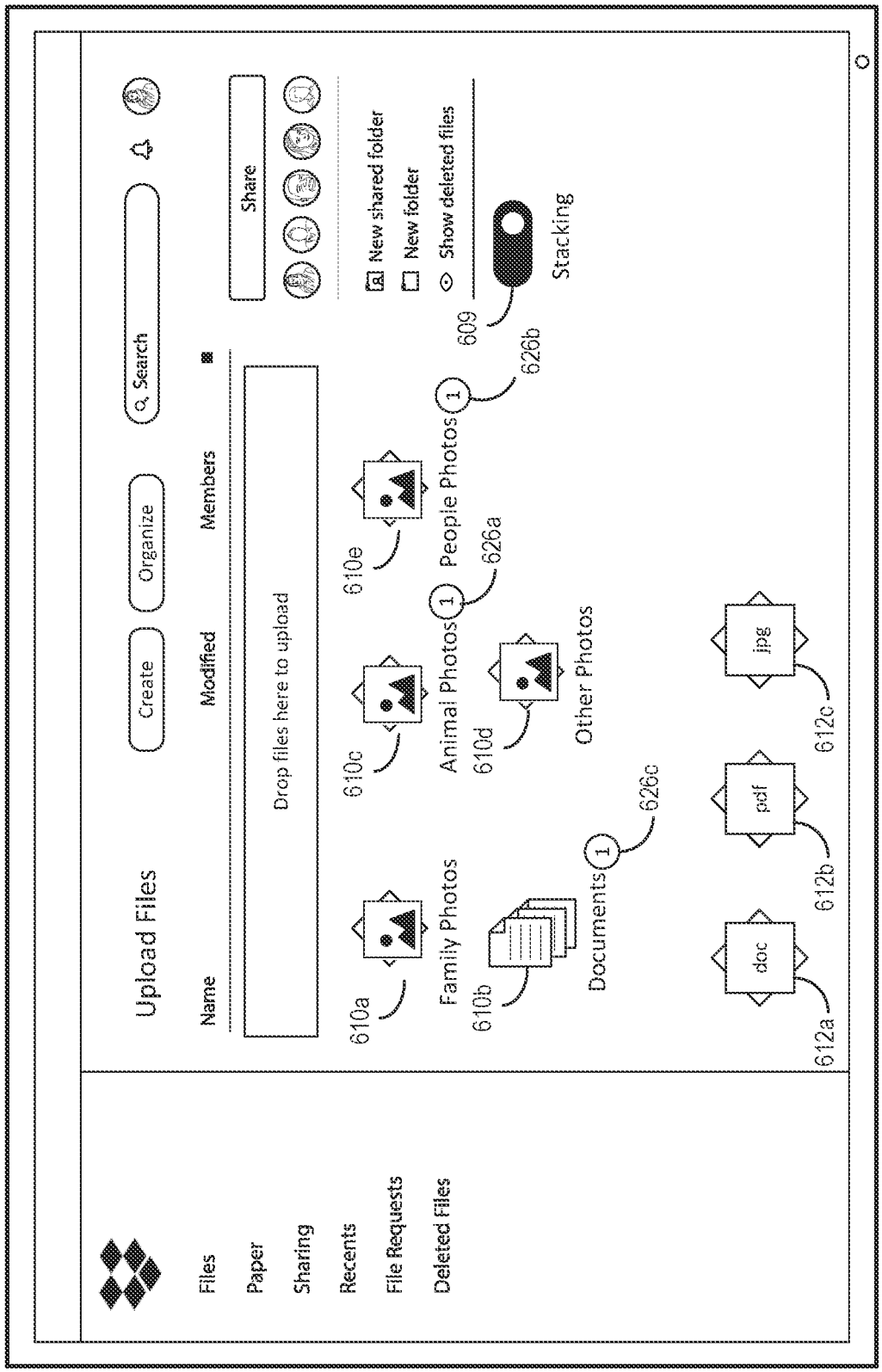
FIG. 6J illustrates an example graphical user interface of indicating the location of content items in one or more visual stacks in accordance with one or more embodiments.
Figure 6K:
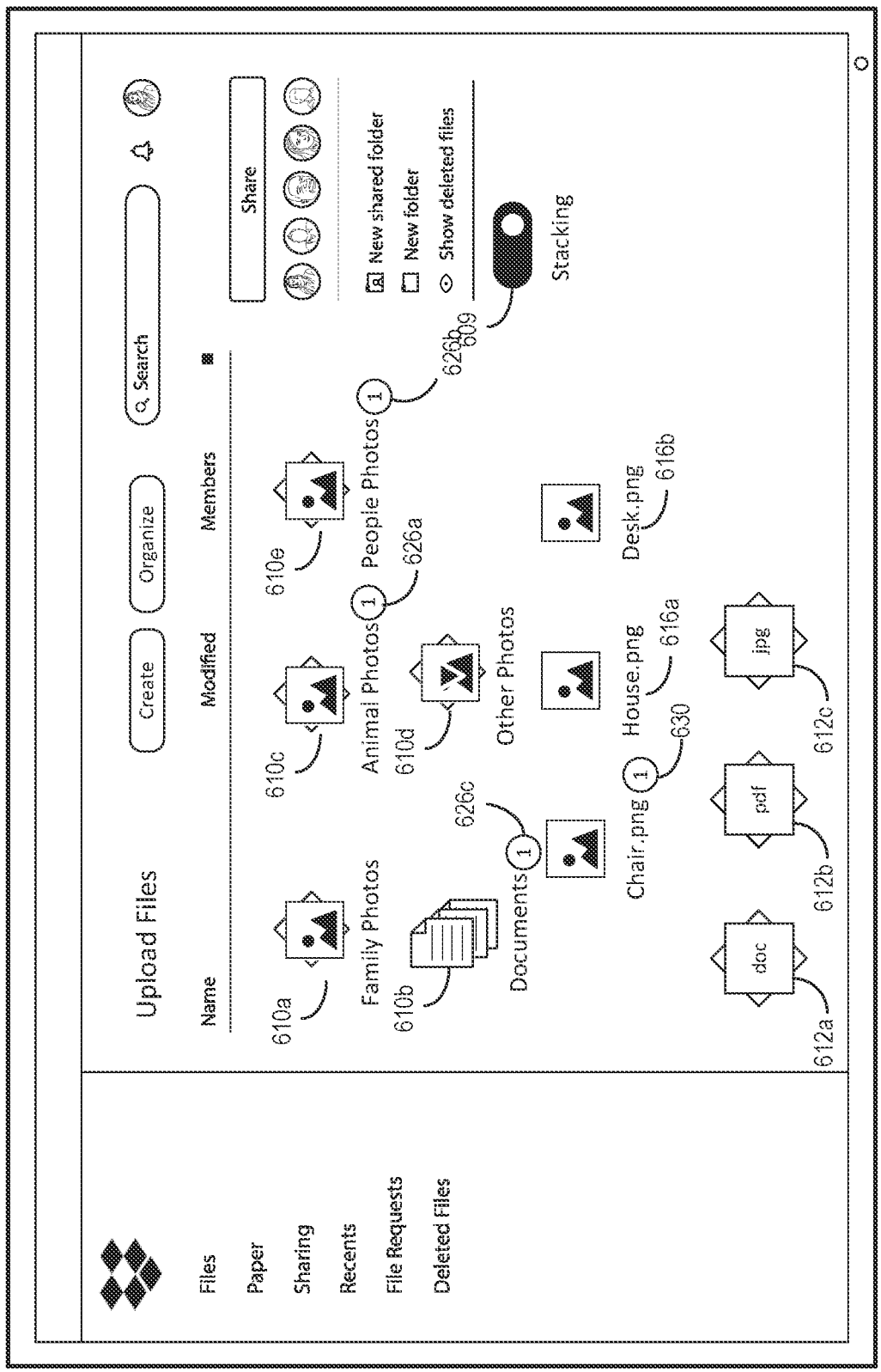
FIG. 6K illustrates an example graphical user interface of providing a set of content items from a visual stack of content items with an indication of uploaded content items in accordance with one or more embodiments.

As shown, FIG. 6I illustrates uploading one or more content items. For example, FIG. 6I shows an act 622 of uploading multiple content items to the content visualization system 102. In particular, FIG. 6I shows the content visualization system 102 receiving newly uploaded files by a drag-and drop of files to an upload portion of the graphical user interface. As also shown, FIG. 6J illustrates the content visualization system 102 providing a visual indication of the visual stack where the newly uploaded files are assigned to. In particular, FIG. 6J shows visual notification 626a-626c corresponding with animal photos 610c, people photos 610e, and documents 610b. As further shown, FIG. 6K illustrates the expansion of a visual stack following the upload of a new content item. For example, FIG. 6K illustrates the selection of other photos 610d and an indicator showing the expansion of the other photos 610d visual stack. In particular, the expansion of the other photos 610d visual stack shows house.png 616a, desk.png 616b, and chair.png 616c with a visual notification 630 next to chair.png. As mentioned, the visual notification 630 shows that one of the newly uploaded files (chair.png) was assigned to the other photos 610d visual stack.

In one or more examples of the example graphical user interfaces shown in FIGS. 6A-6K, the content visualization system 102 assigns a content item to multiple visual stacks. In particular, the content visualization system 102 assigns a first content item to a first visual stack and a second visual stack. For instance, as illustrated by the example graphical user interfaces, the content visualization system 102 display can contain both content item type visual stacks and category. Specifically, the example graphical user interfaces show an animal photos 610c visual stack and content item type visual stacks 612a-612c. If a content item corresponds with multiple stacks, the content visualization system 102 can assign the content item to multiple stacks while still maintaining a back-end file storage hierarchy.

Figure 7A:
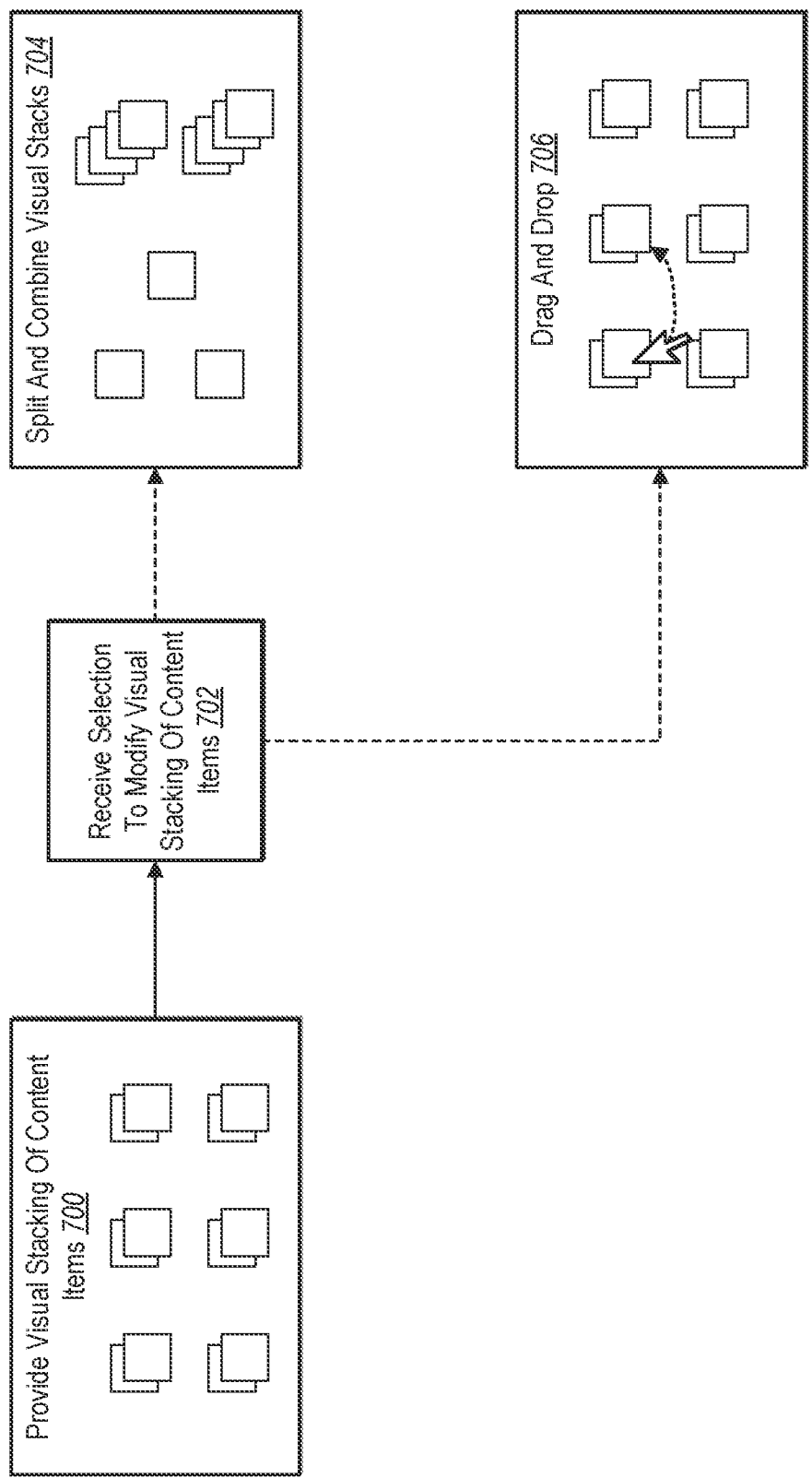

As mentioned previously, the content visualization system 102 can receive a selection to modify visual stacking of content items. For example, as shown, FIG. 7A illustrates the content visualization system 102 performing an act 700. In particular, the act 700 includes providing visual stacking of content items, which was previously discussed. Furthermore, FIG. 7A illustrates the content visualization system 102 performing an act 702. The act 702 includes receiving a selection to modify visual stacking of content items. Specifically, the act 702 of receiving a selection can include i) automatically presenting the option to modify visual stacking, ii) providing the option to modify visual stacking in response to a selection of editing organization options, or iii) presenting within a banner on the display of the graphical user interface options to modify visual stacking of content items.

As shown, FIG. 7A illustrates an act 704. For example, the act 704 includes splitting and combining visual stacks. As mentioned previously, the act 704 includes the client device selecting a first visual stack and selecting a second visual stack to combine the first visual stack with. To illustrate, in combining visual stacks, the content visualization system 102 updates the metadata field corresponding to the stack ID. Additionally, the content visualization system 102 can receive a selection of a first visual stack and an option to split the first visual stack into separate stacks. Specifically, the content visualization system 102 can provide the option of splitting a visual stack by allowing the client device to select all content items within a first split visual stack and a second split visual stack. To illustrate, in splitting visual stacks, the content visualization system 102 further updates the metadata field corresponding to stack IDs. As shown, FIG. 7A further illustrates a drag-and-drop gesture 706. Drag-and-drop gestures were previously discussed, the same principles apply here. For example, the content visualization system 102 detects a drag-and-drop gesture of content items and assigns the content item to a different visual stack.

FIG. 7B further illustrates additional options for modifying visual stacking of content items. For example, FIG. 7B shows an act 708 of changing thumbnails of visual stacks. In particular, the act 708 can include a client device selecting an option for a visual stack to modify the representative thumbnail. As mentioned previously, the content visualization system 102 can determine a representative thumbnail for a visual stack based on machine learning principles. Specifically, the content visualization system 102 can determine a representative thumbnail based on i) recency ii) most frequently accessed or iii) alphabetical order. Based on the determination, the content visualization system 102 shows a representative thumbnail for each visual stack. For instance, the client device can right-click upon a visual stack and choose the option for changing the representative thumbnail. In doing so, the content visualization system 102 presents the option to select a new thumbnail as the representative thumbnail.

As another example, FIG. 7B also illustrates an act 710. In particular, the act 710 includes changing the order within visual stacks. For instance, a stacking machine learning model 712 (discussed previously) determines the order within visual stacks. However, the content visualization system 102 provides the option to modify the order within visual stacks. Specifically, the content visualization system 102 provides a selectable option to override the determination of order within visual stacks and allows the client device to select one of i) content, ii) content type iii) content item name, or iv) recency. Based on the selected option, the content visualization system 102 re-orders the content items within the visual stack.

Figure 8:
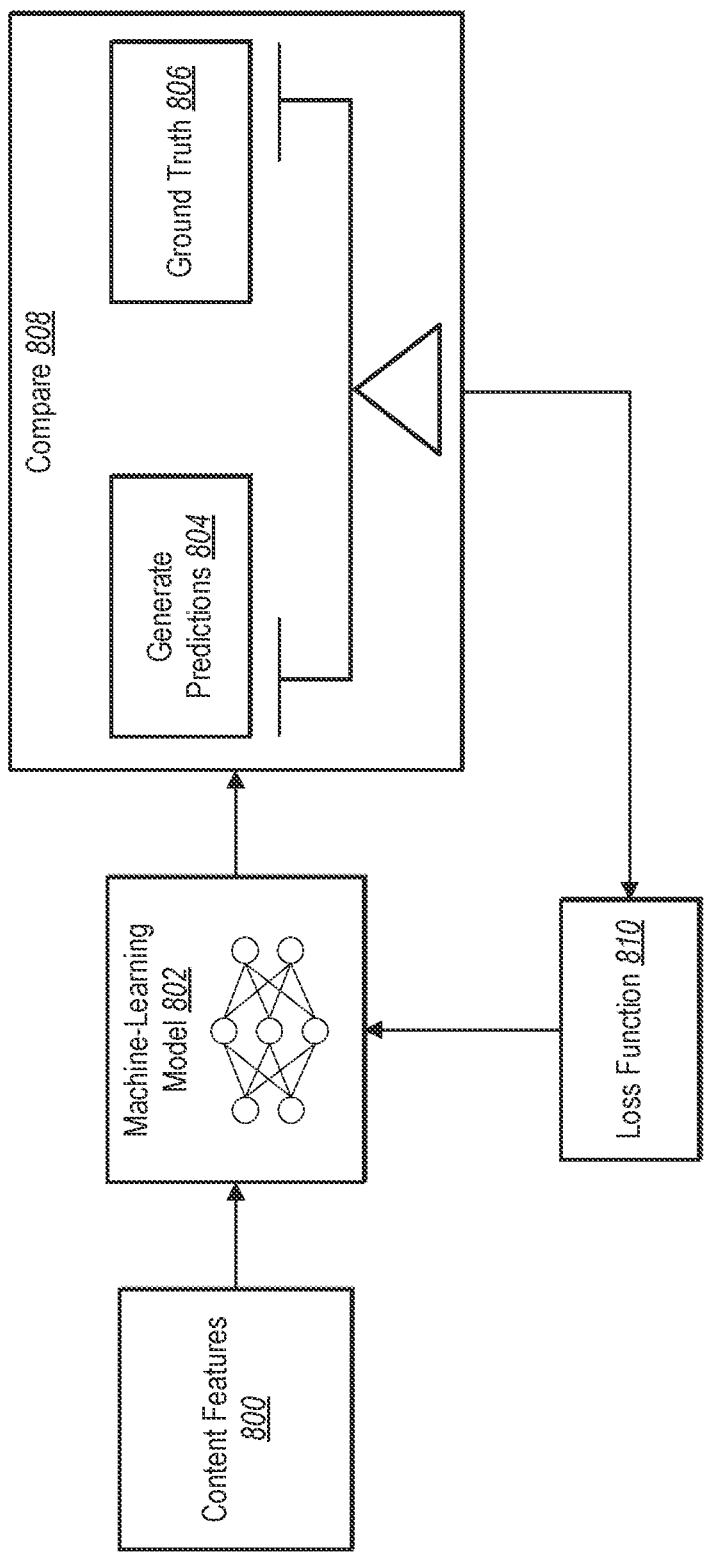
FIG. 8 illustrates an example diagram of training a machine learning model in accordance with one or more embodiments.

As mentioned above, the content visualization system 102 utilizes various machine learning models for determining a file organization score and an order within visual stacks. As shown, FIG. 8 illustrates training a machine learning model 802. For example, FIG. 8 illustrates the machine learning model 802 receiving as input content features 800. As part of training the machine learning model 802, the content visualization system 102 performs a comparison 808. Specifically, the content visualization system 102 compares the generated predictions 804 with a ground truth 806. Indeed, the content visualization system 102 accesses the ground truth 806 from a database, where the ground truth 806 is designated as corresponding to sample data. In some cases, the content visualization system 102 performs the comparison 808 using a loss function 810 such as a mean squared error loss function or a cross entropy loss function to determine an error, or a measure of loss associated with the machine learning model 802 (or between the generated predictions 804 and the ground truth 806).

In one or more embodiments, the content visualization system 102 further performs a parameter modification. Based on the comparison 808, the content visualization system 102 modifies parameters of the machine learning model 802. For example, the content visualization system 102 modifies parameters of the machine learning model 802 to reduce a measure of error or a loss associated with the machine learning model 802. The content visualization system 102 can further repeat the process illustrated in FIG.

8 for many iterations or epochs until the machine learning model 802 satisfies a threshold measure of loss. For each iteration, the content visualization system 102 generates new predictions from new sample data, performs a comparison, and modifies parameters (e.g., via back propagation) to improve predictions for subsequent iterations.

The components of the content visualization system 102 can include software, hardware, or both. For example, the components of the content visualization system 102 can include one or more instructions stored on a computer-readable storage medium and executable by processors of one or more computing devices. When executed by one or more processors, the computer-executable instructions of the content visualization system 102 can cause a computing device to perform the methods described herein. Alternatively, the components of the content visualization system 102 can comprise hardware, such as a special purpose processing device to perform a certain function or group of functions. Additionally, or alternatively, the components of the content visualization system 102 can include a combination of computer-executable instructions and hardware.

Furthermore, the components of the content visualization system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the content visualization system 102 may be implemented as part of a stand-alone application on a personal computing device or a mobile device.

FIGS. 1-8, the corresponding text, and the examples provide a number of different systems and methods for generating and providing suggested content collections to user accounts of a content management system. In addition to the foregoing, implementations can also be described in terms of flowcharts comprising acts steps in a method for accomplishing a particular result. For example, FIG. 9 illustrates an example series of acts for transitioning the folder view to the free flow view.

Figure 9:
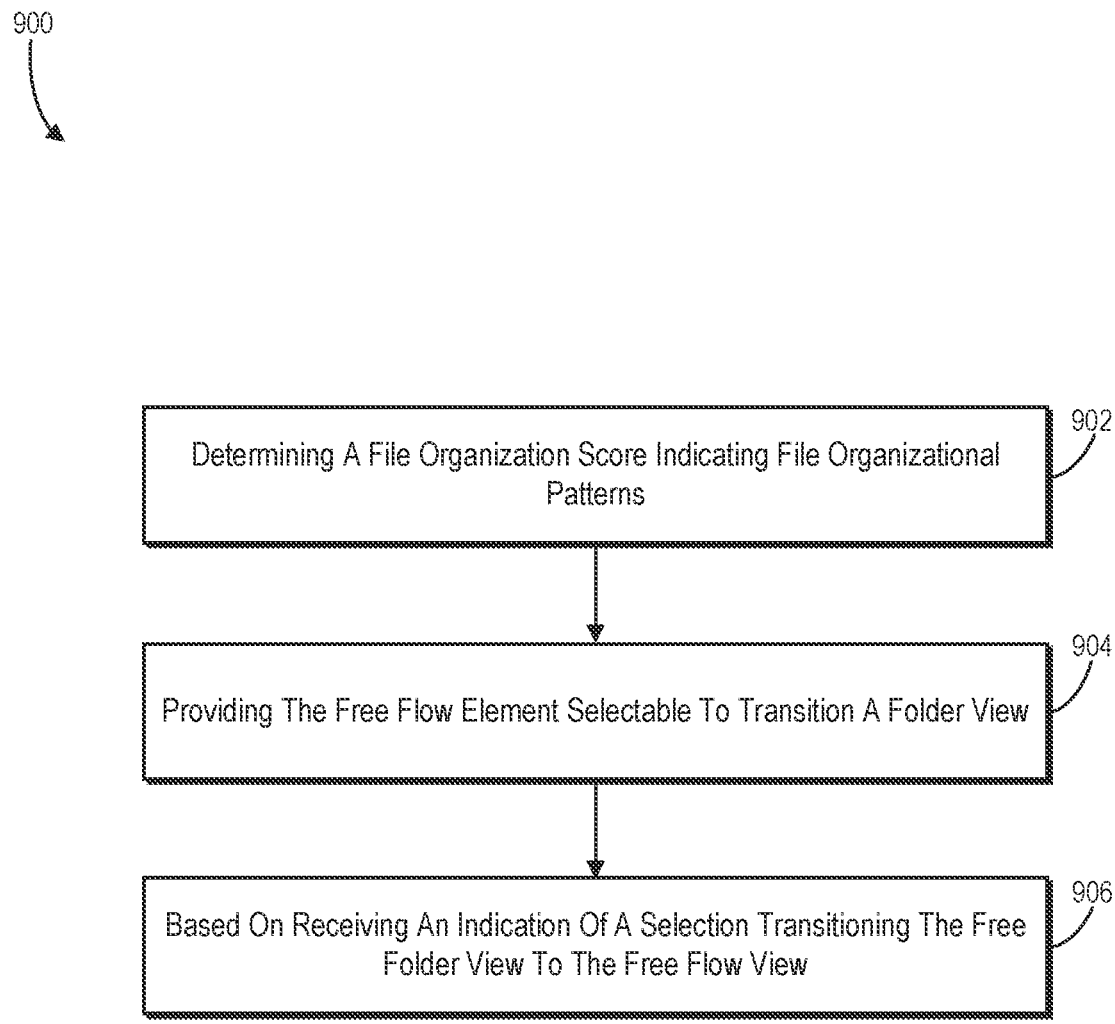
FIG. 9 illustrates a flowchart of a series of acts for transitioning the folder view of the folder into a free flow view in accordance with one or more embodiments.

While FIG. 9 illustrates acts according to certain implementations, alternative implementations may omit, add to, reorder, and/or modify any of the acts shown in FIG. 9. The acts of FIG. 9 can be performed as part of a method. Alternatively, a non-transitory computer-readable medium can comprise instructions, that when executed by one or more processors, cause a computing device to perform the acts of FIG. 9. In still further implementations, a system can perform the acts of FIG. 9.

As illustrated in FIG. 9, a series of acts 900 may include an act 902 of determining a file organization score indicating file organizational patterns. For example, the act 902 includes determining, for a folder associated with a user account of a content management system, the folder comprising content items, a file organization score indicating file organizational patterns associated with the content items within the folder. Further, the act 902 includes determining content features corresponding to the content items in the folder associated with the user account, and generating, utilizing a free flow machine learning model, the file organization score based on the content features.

The series of acts 900 may include an act 904 of providing the free flow element selectable to transition a folder view. For example, the act 904 includes based on the file organization score, providing, for display within a user interface on a client device, a free flow element selectable to transition a folder view comprising a first organizational format into a free flow view comprising a second organizational format. Moreover, the act 904 includes based on the file organization score, provide, for display within a user interface on a client device, a free flow element selectable to transition a folder view comprising a first organizational format into a free flow view comprising a second organizational format without a visual folder hierarchy.

The series of acts 900 may also include an act 906 of based on receiving an indication of a selection transitioning the free folder view to the free flow view. For example, the act 906 includes based on receiving an indication of a selection of the free flow element, transitioning from providing the folder view of the folder to providing the free flow view depicting graphical representations of the content items arranged according to one or more content features associated with the content items. Further, the act 906 includes generating a display of the content items arranged in a plurality of visual stacks of content items.

The series of acts 900 also includes determining content features by determining at least one of: a number of files, a number of subfolders, a number of content items, movement of content items, content item names, content item types, or digital content within content items. The series of acts 900 also includes receiving a selection of a first visual stack of content items from the plurality of visual stacks of content items and based on the selection of the first visual stack, providing for display, a first set of content items from the first visual stack of content items without navigating away from the display of the plurality of visual stacks of content items.

Additionally, the series of acts includes receiving an upload, in the display of the content items in the plurality of visual stacks of content items, a new content item and generating a visual notification corresponding to the uploaded new content item that indicates to which of the plurality of visual stacks of content items the uploaded new content item was assigned. Further, the series of acts includes detecting a drag-and-drop gesture of a content item from a first visual stack to a second visual stack from a plurality of visual stacks and based on the drag-and-drop gesture, assigning the content item from the first visual stack to the second visual stack by updating metadata associated with the content item to indicate the content item is associated with the second visual stack rather than the first visual stack. In addition, the series of acts 900 includes maintaining a back-end file storage hierarchical structure for the folder while providing the free-flow view. Moreover, the series of acts 900 includes adding metadata associated with a first content item indicating that the first content item is assigned to a first visual stack of content items of a plurality of visual stacks of content items and wherein providing the free flow view depicting the graphical representations of the content items comprises identifying the metadata associated with the first content item to generate a graphical representation of the first visual stack. Further the series of acts includes generating the file organization score utilizing the free flow machine learning model based on content features.

Further, the series of acts 900 includes utilizing a machine learning model to determine content items to place within a plurality of visual stacks of content items and generating a display of the content items in the plurality of visual stacks of content items. Additionally, the series of acts 900 includes providing a selectable option to the user account to override determinations made by the machine learning model and determining an order of content items within the plurality of visual stacks based on a selection by the user account of at least one of: frequency of utilizing a content item, recency of utilizing a content item, or previous account behavior. Moreover, the series of acts 900 also includes detecting a drag-and-drop gesture of a content item within a first visual stack to transfer the content item to a second visual stack.

The series of acts 900 also includes arranging the content items in a plurality of visual stacks of content items according to one or more content features. Further, the series of acts 900 includes receiving an upload, in the free flow view depicting graphical representations of content items of a new content item and generating a visual notification corresponding to the uploaded new content item that indicates which of the plurality of visual stacks the uploaded new content item was assigned to. Further, the acts 900 include identifying a representative thumbnail for each of the plurality of visual stacks for the content items arranged in the plurality of the visual stacks, detecting a gesture to change the representative thumbnail for a first visual stack of the plurality of visual stacks, and updating the representative thumbnail for the first visual stack to a new representative thumbnail based on the detected gesture. Additionally, the series of acts 900 includes providing a first selectable option to combine a first visual stack with a second visual stack of the plurality of visual stacks and providing a second selectable option to split the first visual stack.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
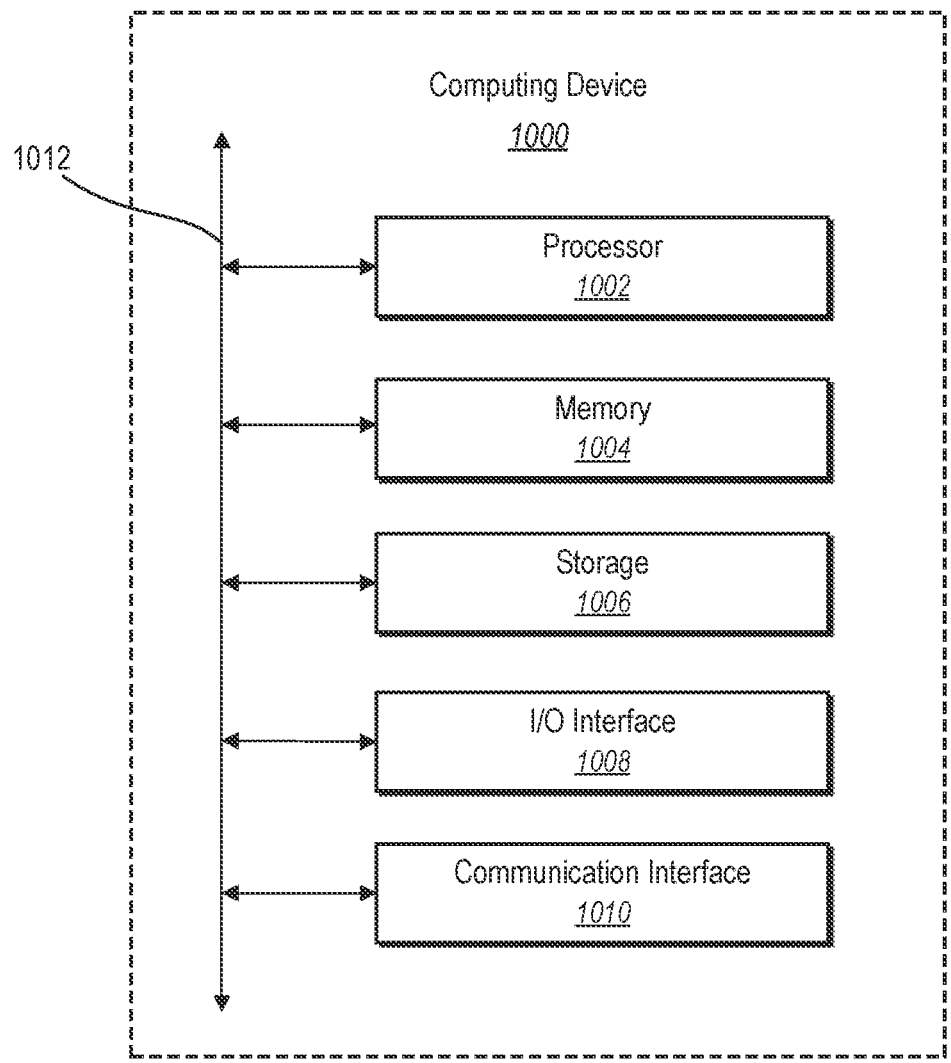
FIG. 10 illustrates a block diagram of an exemplary computing device in accordance with one or more embodiments.

FIG. 10 illustrates a block diagram of exemplary computing device 1000 (e.g., the server(s) 104 and/or the client device 108) that may be configured to perform one or more of the processes described above. One will appreciate that server(s) 104 and/or the client device 108 may comprise one or more computing devices such as computing device 1000. As shown by FIG. 10, computing device 1000 can comprise processor 1002, memory 1004, storage device 1006, I/O interface 1008, and communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other implementations. Furthermore, in certain implementations, computing device 1000 can include fewer components than those shown in FIG. 10. Components of computing device 1000 shown in FIG. 10 will now be described in additional detail.

In particular implementations, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage device 1006 and decode and execute them. In particular implementations, processor 1002 may include one or more internal caches for data, instructions, or addresses. As an example, and not by way of limitation, processor 1002 may include one or more instruction caches, one or more data caches, and one or more translation lookaside buffers (TLBs). Instructions in the instruction caches may be copies of instructions in memory 1004 or storage device 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example, and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to computing device 1000. In particular implementations, storage device 1006 is non-volatile, solid-state memory. In other implementations, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
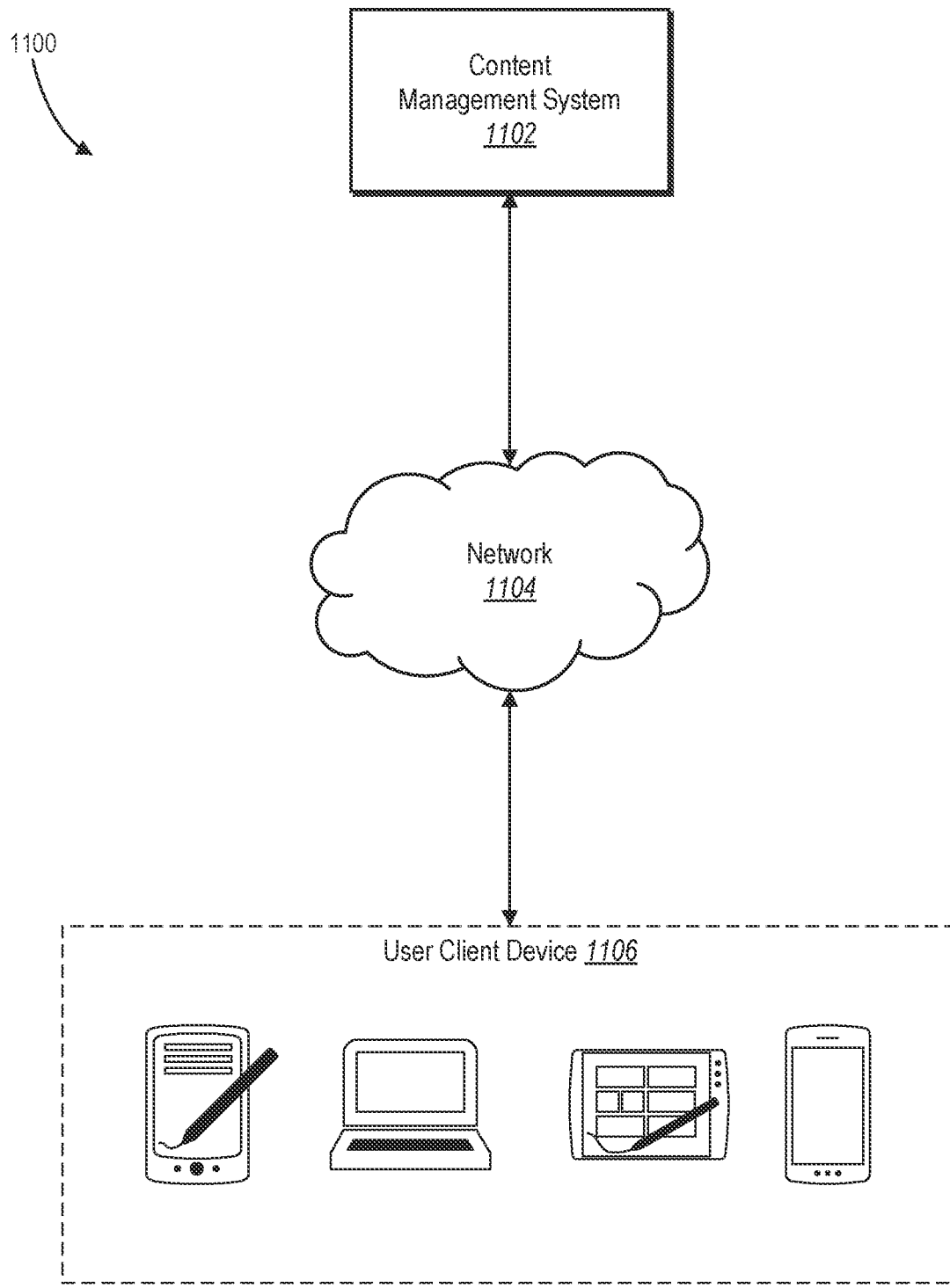
FIG. 11 illustrates an example environment of a networking system having the content visualization system in accordance with one or more embodiments.

FIG. 11 is a schematic diagram illustrating environment 1100 within which one or more implementations of the content visualization system 102 can be implemented. For example, the content visualization system 102 may be part of a content management system 1102 (e.g., the content management system 106). Content management system 1102 may generate, store, manage, receive, and send digital content (such as digital content items). For example, content management system 1102 may send and receive digital content to and from client devices 1106 by way of network 1104. In particular, content management system 1102 can store and manage a collection of digital content. Content management system 1102 can manage the sharing of digital content between computing devices associated with a plurality of users. For instance, content management system 1102 can facilitate a user sharing a digital content with another user of content management system 1102.

In particular, content management system 1102 can manage synchronizing digital content across multiple client devices 1106 associated with one or more users. For example, a user may edit digital content using client device 1106. The content management system 1102 can cause client device 1106 to send the edited digital content to content management system 1102. Content management system 1102 then synchronizes the edited digital content on one or more additional computing devices.

In addition to synchronizing digital content across multiple devices, one or more implementations of content management system 1102 can provide an efficient storage option for users that have large collections of digital content. For example, content management system 1102 can store a collection of digital content on content management system 1102, while the client device 1106 only stores reduced-sized versions of the digital content. A user can navigate and browse the reduced-sized versions (e.g., a thumbnail of a digital image) of the digital content on client device 1106. In particular, one way in which a user can experience digital content is to browse the reduced-sized versions of the digital content on client device 1106.

Another way in which a user can experience digital content is to select a reduced-size version of digital content to request the full- or high-resolution version of digital content from content management system 1102. In particular, upon a user selecting a reduced-sized version of digital content, client device 1106 sends a request to content management system 1102 requesting the digital content associated with the reduced-sized version of the digital content. Content management system 1102 can respond to the request by sending the digital content to client device 1106. Client device 1106, upon receiving the digital content, can then present the digital content to the user. In this way, a user can have access to large collections of digital content while minimizing the amount of resources used on client device 1106.

Client device 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access content management system 1102.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   determining, for folders associated with a user account of a content management system, a file organization score based in part on a folder hierarchy structure for the folders, the file organization score indicating file organizational patterns associated with content items included within the folders;
   determining, based on the file organization score, that the folder hierarchy structure indicates a disorganized storage pattern corresponding to the content items included within the folders associated with the user account;
   based on the file organization score indicating the disorganized storage pattern, providing, for display within a user interface on a client device, a free flow element selectable to transition from a folder hierarchy view comprising the folder hierarchy structure to a free flow view comprising a non-hierarchical organizational structure; and
   based on receiving an indication of a selection of the free flow element, transitioning from providing the folder hierarchy view to providing the free flow view, the free flow view depicting graphical representations of the content items arranged according to one or more content features associated with the content items.

2. The computer-implemented method of claim 1, wherein determining the file organization score further comprises:
   determining content features corresponding to the content items within the folders associated with the user account; and
   generating, utilizing a free flow machine learning model, the file organization score based on the content features.

3. The computer-implemented method of claim 2 further comprising determining content features by determining at least one of: a number of files, a number of subfolders, a number of content items, movement attributes of content items, content item names, content item types, or digital content within content items.

4. The computer-implemented method of claim 1, wherein determining the disorganized storage pattern is based on calculating a number of subfolders in the content management system and the number of subfolders failing to satisfy a subfolder threshold or determining a threshold number of movements of the content items within the content management system.

5. The computer-implemented method of claim 1, wherein depicting graphical representations of the content items within the free flow view comprises:
   generating a display of the content items arranged in a plurality of visual stacks of content items;
   receiving a selection of a first visual stack of content items from the plurality of visual stacks of content items; and
   based on the selection of the first visual stack, providing for display, a first set of content items from the first visual stack of content items without navigating away from the display of the plurality of visual stacks of content items.

6. The computer-implemented method of claim 5, further comprising:
   receiving an upload of a new content item;
   assigning the new content item to a first visual stack from the plurality of stacks; and
   generating a visual notification corresponding to the new content item that indicates the new content item was assigned to the first visual stack.

7. The computer-implemented method of claim 5, further comprises:
   detecting a drag-and-drop gesture of a content item from a first visual stack to a second visual stack from the plurality of visual stacks; and
   based on the drag-and-drop gesture, assigning the content item from the first visual stack to the second visual stack by updating metadata associated with the content item to indicate the content item is associated with the second visual stack rather than the first visual stack.

8. The computer-implemented method of claim 1, further comprising maintaining a back-end file storage hierarchical structure for the folders while providing the free flow view.

9. The computer-implemented method of claim 1, wherein determining that the folder hierarchy structure indicates the disorganized storage pattern is based on determining a measure of similarity between a subset of content items within a folder of the content management system or determining content item types.

10. A system comprising:
    at least one processor; and
    a non-transitory computer-readable medium comprising instructions that, when executed by the at least one processor, cause the system to:
       determine, for folders associated with a user account of a content management system, utilizing a free flow machine learning model, a file organization score based in part on a folder hierarchy structure for the folders, the file organization score indicating file organizational patterns associated with content items within the folders;
       determine, based on the file organization score, that the folder hierarchy structure indicates a disorganized storage pattern corresponding to the content items included within the folders associated with the user account;
       based on the file organization score indicating the disorganized storage pattern, provide, for display within a user interface on a client device, a free flow element selectable to transition from a folder hierarchy view comprising the folder hierarchy structure to a free flow view comprising a non-hierarchical organizational structure; and
       based on receiving an indication of a selection of the free flow element, transition from providing the folder hierarchy view of the folders to providing the free flow view depicting graphical representations of the content items arranged according to one or more content features associated with the content items.

11. The system of claim 10, wherein determining the file organization score further comprises instructions that, when executed by the at least one processor, cause the system to generate the file organization score utilizing the free flow machine learning model based on content features.

12. The system of claim 10, wherein depicting graphical representations of the content items within the free flow view further comprises instructions that, when executed by the at least one processor, cause the system to:
    utilize a machine learning model to determine content items to assign to a plurality of visual stacks of content items; and
    provide, for display on a client device associated with the user account, the plurality of visual stacks of content items.

13. The system of claim 12, wherein determining content items to assign to the plurality of visual stacks is based on at least one of: digital content of the content items, file type, file name, or recency.

14. The system of claim 12, further comprising instructions that, when executed by the at least one processor, cause the system to:
provide one or more selectable options to override determinations made by the machine learning model; and
determine an order of content items within the plurality of visual stacks based on receiving an indication of a user selection of a selectable option related to at least one of: frequency of utilizing a content item, recency of utilizing a content item, or previous account behavior.

15. The system of claim 10, further comprising instructions that, when executed by the at least one processor, cause the system to detect a drag-and-drop gesture of a content item within a first visual stack to reassign the content item to a second visual stack.

16. A non-transitory computer-readable medium comprising instructions that, when executed by at least one processor, cause the at least one processor to:
determine, for folders associated with a user account of a content management system, the folders comprising content items, a file organization score based in part on a folder hierarchy structure for the folders, the file organization score indicating file organizational patterns within the folder associated with the content items within the folders;
determine, based on the file organization score, that the folder hierarchy structure indicates a disorganized storage pattern corresponding to the content items included within the folders associated with the user account;
based on the file organization score indicating the disorganized storage pattern, provide, for display within a user interface on a client device, a free flow element selectable to switch from providing a folder hierarchy view comprising the folder hierarchy structure to providing a free flow view comprising a non-hierarchical organizational structure;
based on receiving an indication of a selection of the free flow element, transition from providing the folder hierarchy view of the folders to providing the free flow view depicting graphical representations of content items; and
arrange the content items in a plurality of visual stacks according to one or more content features.

17. The non-transitory computer-readable medium of claim 16, further comprising instructions that, when executed by the at least one processor, cause the at least one processor to:
receive an upload of a new content item; and
generate a visual notification corresponding to the new content item that indicates to which of the plurality of visual stacks the new content item was assigned.

18. The non-transitory computer-readable medium of claim 16, further comprising instructions that, when executed by the at least one processor, cause the at least one processor to maintain a back-end file storage hierarchical structure for the folders while providing the free flow view.

19. The non-transitory computer-readable medium of claim 16, further comprising instructions that, when executed by the at least one processor, cause the at least one processor to:
identify a representative thumbnail for each of the plurality of visual stacks for the content items arranged in the plurality of visual stacks;
detect a user interaction to change the representative thumbnail for a first visual stack of the plurality of visual stacks; and
update the representative thumbnail for the first visual stack to a new representative thumbnail.

20. The non-transitory computer-readable medium of claim 16, further comprising instructions that, when executed by the at least one processor, cause the at least one processor to:
provide a first selectable option to combine a first visual stack with a second visual stack of the plurality of visual stacks; and
provide a second selectable option to split the first visual stack into two or more visual stacks.

* * * * *